(12) United States Patent
Chan et al.

(10) Patent No.: US 7,812,718 B1
(45) Date of Patent: Oct. 12, 2010

(54) DISTRIBUTED POSITION ESTIMATION FOR WIRELESS SENSOR NETWORKS

(75) Inventors: Gary Shueng-Han Chan, Hong Kong (CN); Victor Cheung, Hong Kong (CN); Kin-Fung Wong, Hong Kong (CN); Ivor Wai Hung Tsang, Hong Kong (CN); James Tin Yau Kwok, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 995 days.

(21) Appl. No.: 11/603,263

(22) Filed: Nov. 21, 2006

Related U.S. Application Data

(60) Provisional application No. 60/738,062, filed on Nov. 21, 2005.

(51) Int. Cl.
*G08B 1/08* (2006.01)
(52) U.S. Cl. .............. 340/539.13; 340/686.1; 342/357.01; 455/456.1; 709/223
(58) Field of Classification Search ............ 340/539.13, 340/539.16, 539.17, 539.21, 686.1; 342/352, 342/357.01, 357.06, 357.08, 357.12; 455/456.1–457
See application file for complete search history.

(56) References Cited

U.S. PATENT DOCUMENTS

| | | | |
|---|---|---|---|
| 5,552,794 A | 9/1996 | Colley et al. | |
| 5,929,806 A | 7/1999 | Birchler et al. | |
| 5,970,414 A | 10/1999 | Bi et al. | |
| 6,181,944 B1 | 1/2001 | Uebayashi et al. | |
| 6,473,038 B2 | 10/2002 | Patwari et al. | |
| 6,477,380 B1 | 11/2002 | Uehara et al. | |
| 6,563,461 B1 | 5/2003 | Eigersma et al. | |
| 6,567,669 B1 | 5/2003 | Groome | |
| 6,683,568 B1 | 1/2004 | James et al. | |
| 6,684,250 B2 | 1/2004 | Anderson et al. | |
| 6,700,535 B2 | 3/2004 | Gilkes et al. | |
| 6,885,969 B2 | 4/2005 | Sahinoglu | |
| 6,894,645 B1 | 5/2005 | Akopian et al. | |
| 6,944,466 B2 | 9/2005 | Bi et al. | |
| 6,950,059 B2 | 9/2005 | Rapoport et al. | |
| 7,003,325 B2 | 2/2006 | Matsutani et al. | |
| 7,013,150 B2 | 3/2006 | Okanoue et al. | |
| 7,039,546 B2 | 5/2006 | Sawada et al. | |
| 2003/0050075 A1* | 3/2003 | Rangarajan et al. | 455/456 |
| 2004/0152420 A1* | 8/2004 | Redi et al. | 455/67.11 |
| 2005/0020275 A1* | 1/2005 | Agrawala et al. | 455/456.1 |
| 2008/0158062 A1* | 7/2008 | Fullerton et al. | 342/458 |

* cited by examiner

*Primary Examiner*—George A Bugg
(74) *Attorney, Agent, or Firm*—Schwabe, Williamson & Wyatt

(57) ABSTRACT

An effective method of allowing a sensor node to estimate its own position, based only on coarse distances to its neighbors, together with an embedding mathematical tool. This method involves four major steps for each of the nodes: estimating distances to and exchange distance information with nearby nodes; performing position estimation locally; broadcasting the result; and refining its estimation. It also supports nodes joining/leaving the network and nodes with lower power. Further, because useful information for position-based routing is already embedded during the position estimation process, no extra transmission is required for efficient route determination in reporting data to a collecting node.

43 Claims, 20 Drawing Sheets

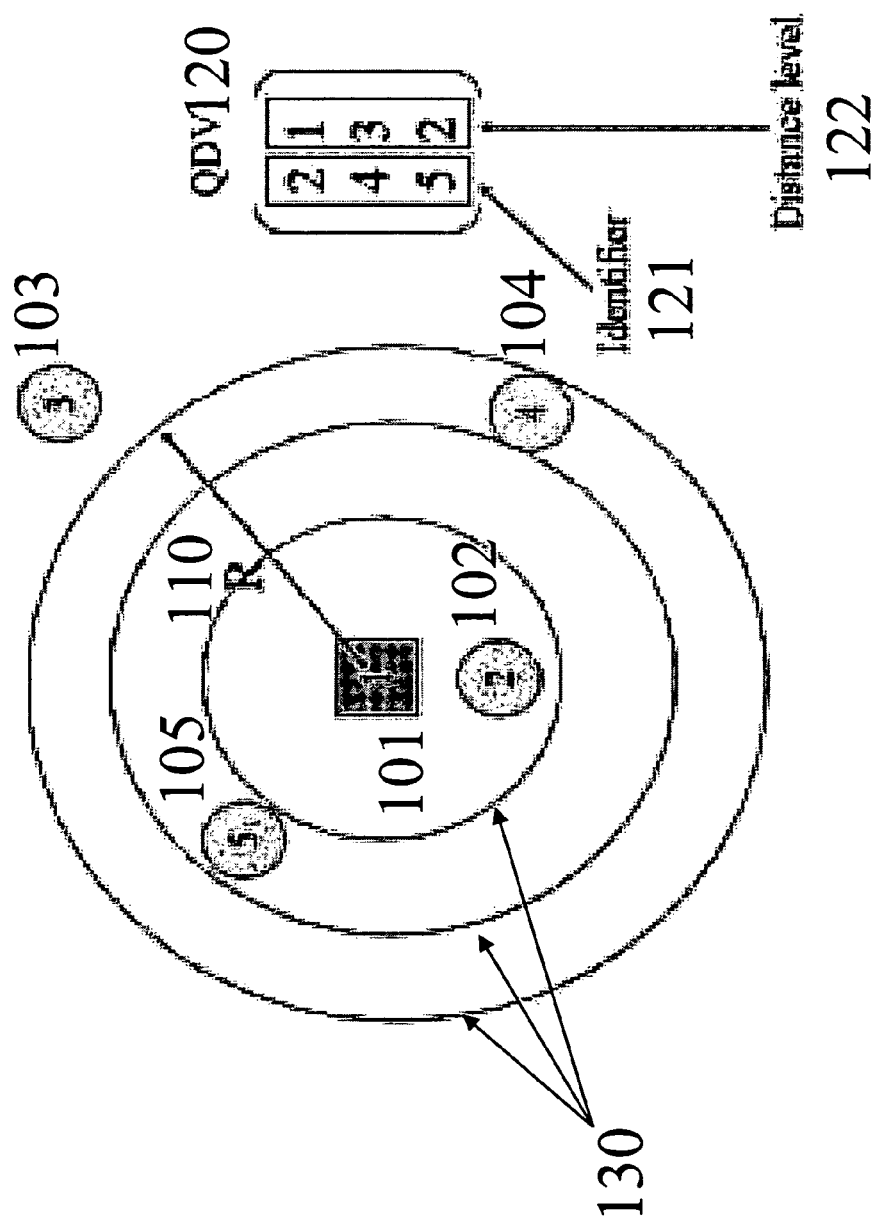
Fig. 1: Quantized Distance and Quantized Distance Vector (QDV). R is the maximum transmission range of the node.

(a) Sending of QDV to the querying node (Node 1).

(b) Compilation of the distance matrix $G$.

Fig. 6

TABLE I

A SUMMARY OF MESSAGE TYPES USED FOR QDV CONSTRUCTION.

beacon message

610

| Msg Type | Source Node ID | Distance Level ← 611 | – |
|---|---|---|---| beacon reply message

620

| Msg Type | Source Node ID | Reply To Node ID | Distance Level | – |
|---|---|---|---|---|

QDV request message

630

| Msg Type | Source Node ID | – | – |
|---|---|---|---|

QDV reply message

640

| Msg Type | Source Node ID | Reply To Node ID | – |
|---|---|---|---|
| | Identifier_1 | Distance Level_1 | |
| | Identifier_2 | Distance Level_2 | |
| ... | | | |

Fig. 7

TABLE II

A SUMMARY OF MESSAGE TYPES USED FOR POSITION ESTIMATION.

bootstrap broadcast

| Msg Type | Bootstrap Node ID | Bootstrap Position | Seq Number |
|---|---|---|---|
| | Identifier_1 | Position_1 | |
| | Identifier_2 | Position_2 | |
| | ... | | |

710 position update broadcast

| Msg Type | Bootstrap Node ID | Bootstrap Position | Seq Number |
|---|---|---|---|
| | Identifier | Position | |

720 special poll

| Msg Type | Source Node ID | | — |
|---|---|---|---|

730 reply to special poll

| Msg Type | Source Node ID | Reply To Node ID | Position |
|---|---|---|---|

TABLE II

SYSTEM PARAMETERS USED IN THE SCHEME.

| System Parameter | Value |
|---|---|
| Grid size | 100 × 100 |
| Density | 0.1 |
| Number of bootstrap nodes | 9 |
| Node's maximum radio range | 10 |
| Number of node's quantization levels | 4 |
| Threshold for performing position estimation | 8 |

(a) At the start of the scheme.

(b) Nodes with position estimated after broadcasts from bootstrap nodes.

(c) Nodes with position estimated after performing mISOMAP or average estimation.

(d) Nodes with position estimated after performing mISOMAP or average estimation.

(e) Nodes with position estimated after performing mISOMAP or average estimation.

(f) Nodes with position estimated with all nodes performed mISOMAP or average estimation.

(a) Rotated map.

(b) Reflected map.

Fig. 12
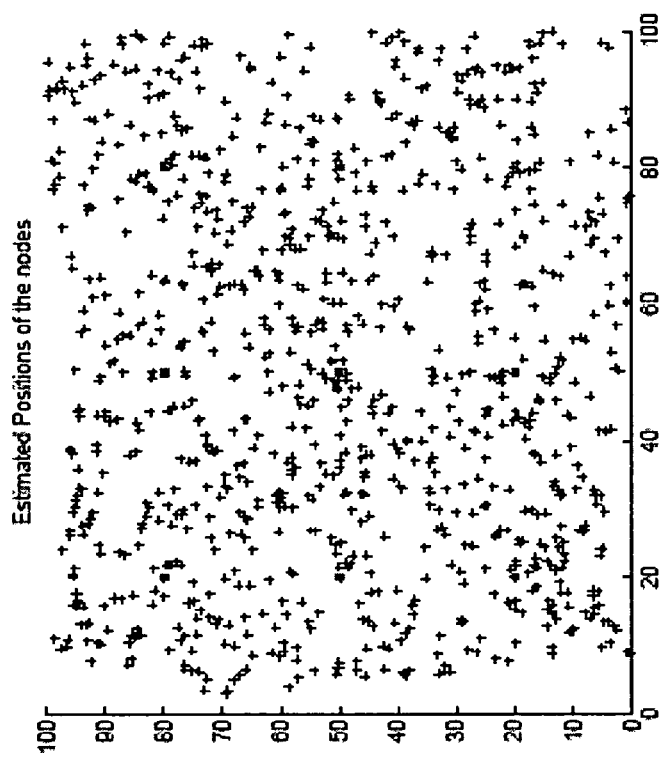
(b) Estimated positions of the nodes.
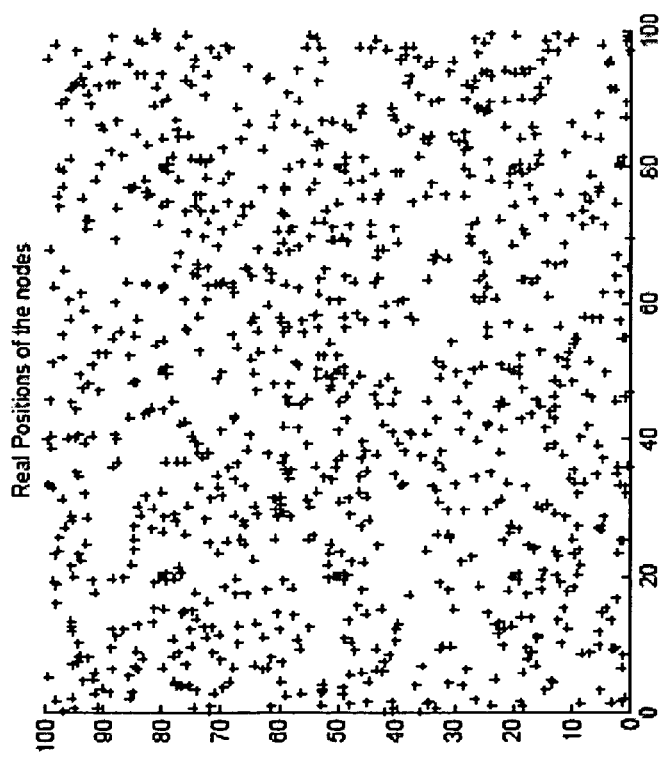
(a) Real positions of the nodes.

Fig. 13
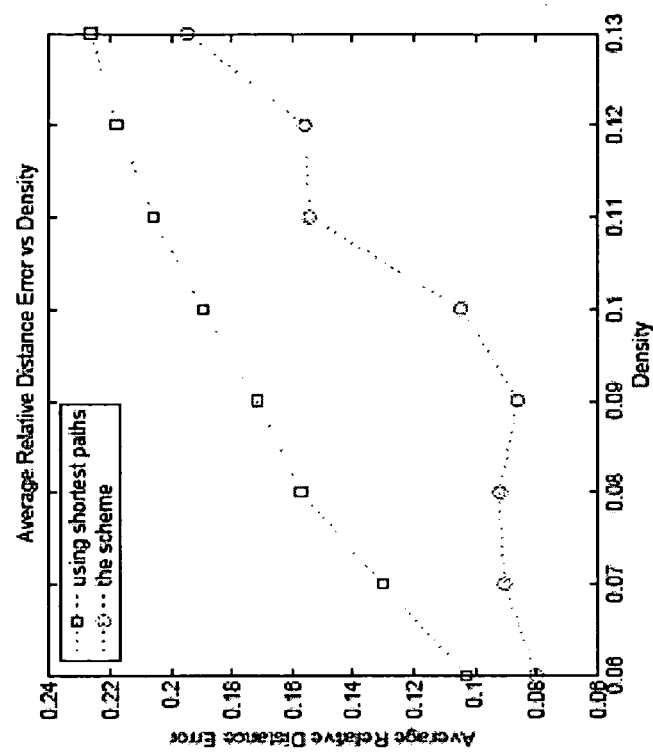
(b) Average Relative Distance Error versus Density.
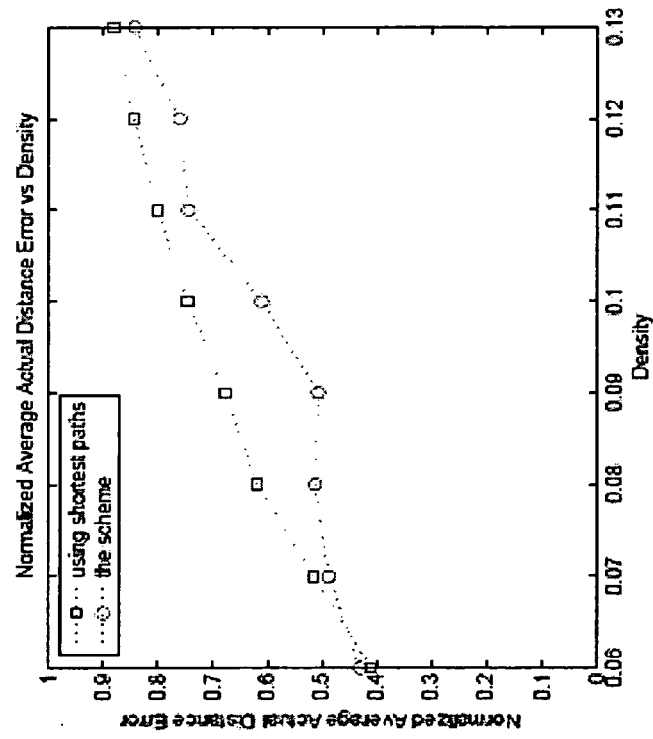
(a) Normalized Average Actual Distance Error versus Density.

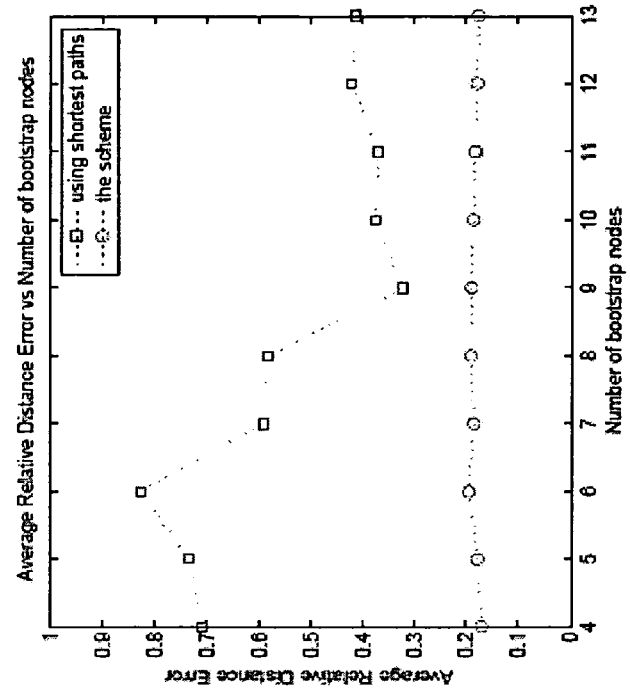
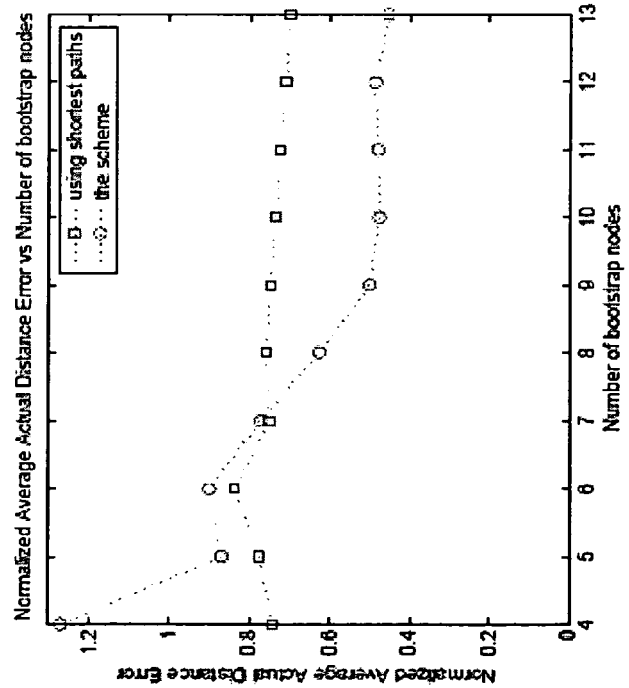
(a) Normalized Average Actual Distance Error versus Number of bootstrap nodes.
(b) Average Relative Distance Error versus Number bootstrap nodes.
Fig. 14

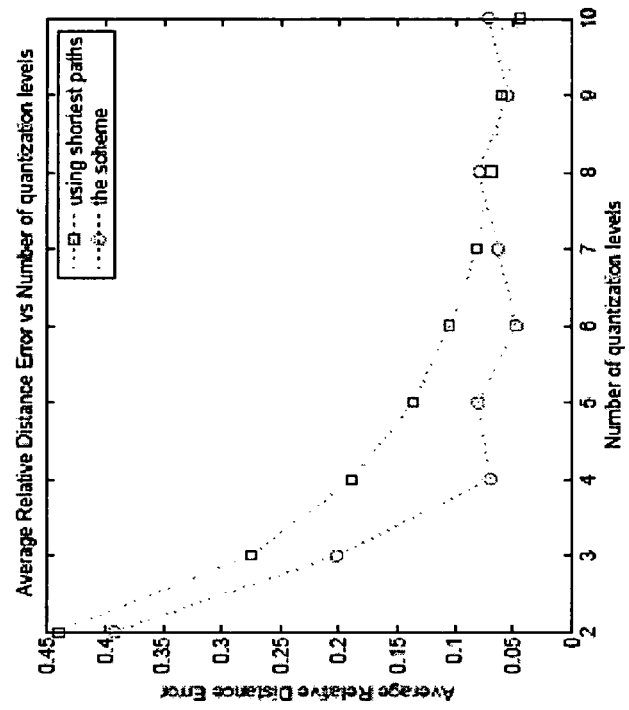
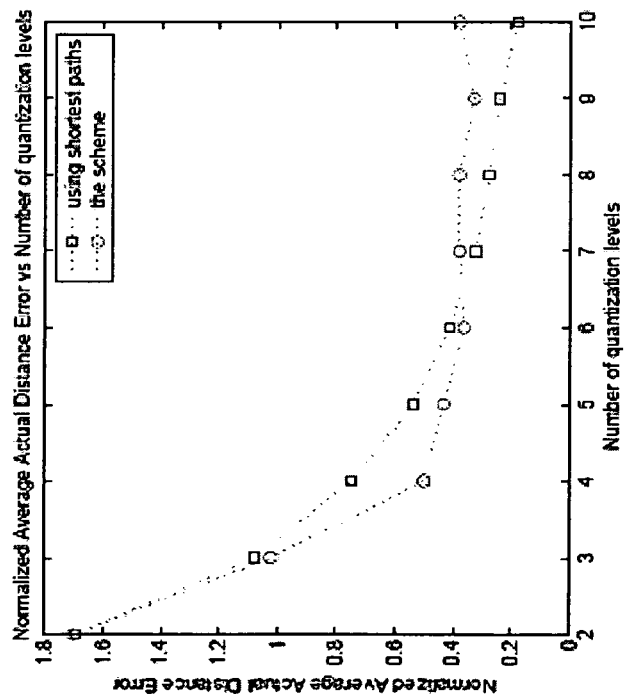
Fig. 15
(a) Normalized Average Actual Distance Error versus Number of quantization levels.
(b) Average Relative Distance Error versus Number of quantization levels.

Fig. 16
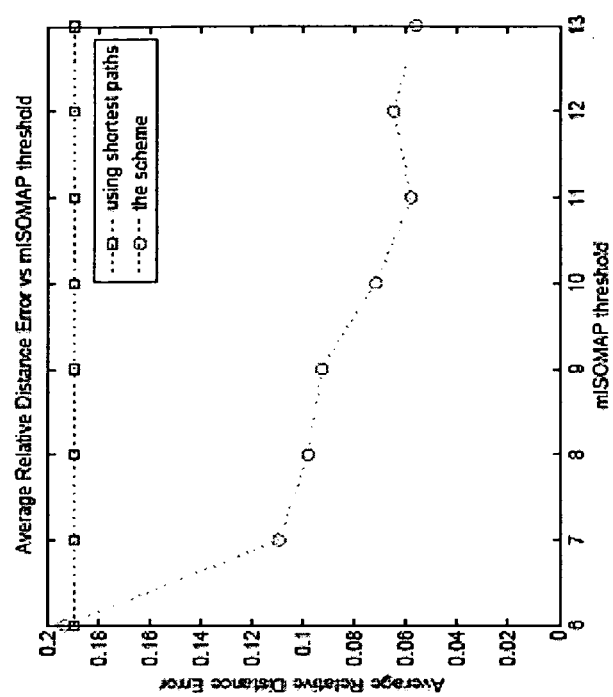
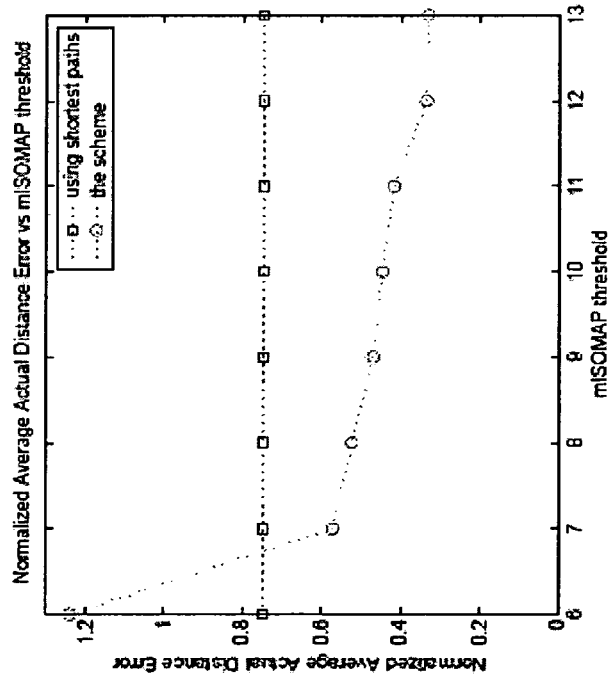
(a) Normalized Average Actual Distance Error versus mISOMAP threshold.
(b) Average Relative Distance Error versus mISOMAP threshold.

Fig. 17
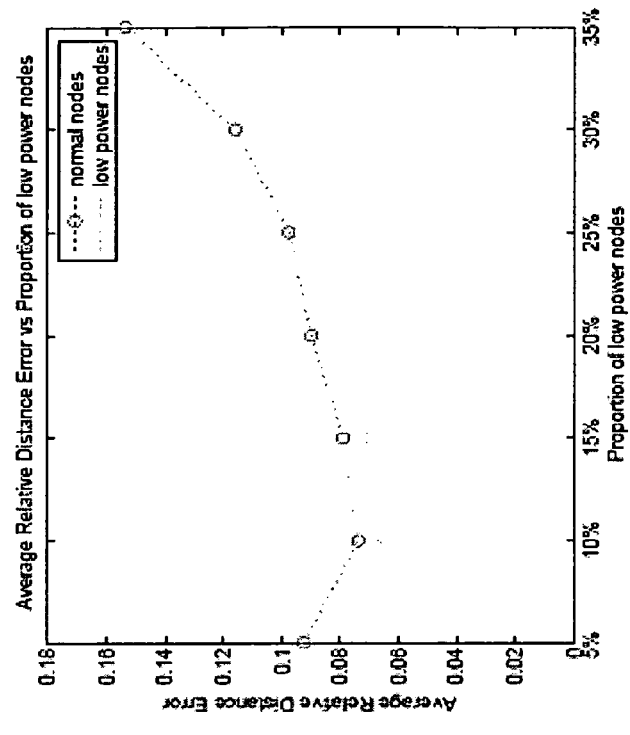
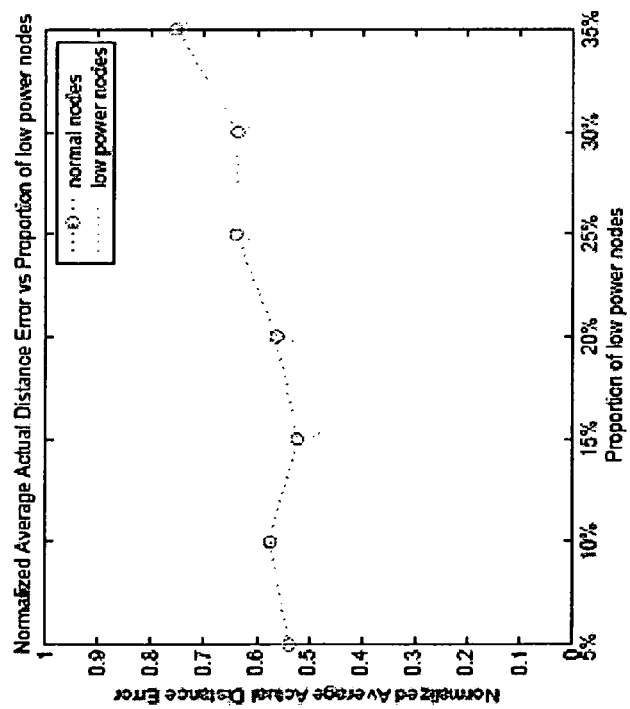
(a) Normalized Average Actual Distance Error versus Proportion of low power nodes.
(b) Average Relative Distance Error versus Proportion of low power nodes.

DISTRIBUTED POSITION ESTIMATION FOR WIRELESS SENSOR NETWORKS

CROSS REFERENCE TO RELATED APPLICATIONS

This application claims priority from U.S. provisional patent application 60/738,062 filed on Nov. 21, 2006, which is hereby incorporated by reference.

BACKGROUND AND SUMMARY OF THE INVENTION

The present application relates to nodal position estimation in wireless networks, and more particularly to position based services in wireless sensor networks.

A Wireless Sensor Network (WSN) is a group of sensor nodes performing some sensing tasks jointly through wireless radio interface. Unlike other wireless networks, WSNs are characterized by many nodes (usually in excess of a hundred) of high density, low computational power and limited transmission range. Depending on the application, sensor nodes can be stationary or mobile. A stationary (or low mobility) network discussed here is commonly used for environmental monitoring type of applications, which is one of the major applications of WSNs. These applications include e.g. monitoring the temperature or moisture variation over an area of interest, detecting intruders within private premises, or exploring unknown surrounding environment without risking human lives.

For most applications of WSNs, it is very useful to know the nodal positions where the data is measured. Nodal position is particularly useful in, the following two cases: position-based routing and position specific applications.

Position-Based Routing

As the transmission range of each node in a WSN is limited, data forwarding would normally be required to go through multi-hops. It is therefore desirable to lower the number of intermediate nodes, as this implies less communication is required, and thus reducing energy consumption. Optimization of the network topology (in terms of positions of neighboring nodes) provides useful constraints for route correctness and efficiency, and thereby leads to a reduction in the packet loss to the destination nodes, the power consumed for routing, and/or the number of hops to the destination (and hence increase in the throughput).

Position-Specific Applications

Position information of the nodes is essential for their proper functioning in position-specific applications. Examples are locating a problematic area (due to flooding, chemical, etc) in a city or forest, or tracking the parking position of one's car. Very often sensors are used to monitor an area of interest, and in such cases it is essential to have the position of the node bound to its measurement.

Many techniques have been proposed to estimate nodal positions, focusing on different types of wireless environment with different requirements. Hence, not all schemes are applicable in a wireless sensor network setting. One example is the GPS system in which nodal positions are estimated via communications between GPS devices and satellites traveling in space. While it provides a fairly accurate estimation up to meters, it requires costly special receivers and high energy demanding for networks with a large number of nodes, such as sensor networks.

However, position information from GPS is useful as it provides an existing coordinate system for use. It is therefore a common practice to assume only a small amount of nodes in a sensor network with GPS capability as reference nodes or landmarks, while the nodal positions of other nodes are estimated by using the reference nodes' positions together with other information such as distances and angles. In general, depending on the way positions are estimated, position estimation techniques for sensor networks may be divided into the following three categories: distance-based, angle-based and pattern-based.

Distance-Based

This category of techniques makes use of distances between nodes and mathematical tools such as trilateration and multi-dimensional scaling (MDS) for position estimation. The distances could be represented discretely and the loss of accuracy can be compensated by aggregating measurements from a number of nodes. In particular, if the distances are represented in a binary manner, they are often referred to as "connectivities" instead. While these techniques usually have the advantages of simple calculation and without special hardware requirements, they are often prone to measurement errors incurred in measuring distances. Depending on the way distances are measured, the degree of error varies with the changing environment.

Angle-Based

Techniques in this category make use of measured angles among nodes to estimate nodal positions via triangulation. Because a triangulation problem can be transformed into a trilateration problem, angle-based techniques enjoy the simplicity in calculation similar to that in distance-based techniques. Further, they are less prone to measurement error caused by signal attenuation, and have better energy conservation and bandwidth utilization as the signal can be sent with a direction. However, this category requires special hardware to measure the angles (e.g. Cricket compasses), which may lead to an increase in cost and energy requirements.

Pattern-Based

In this category, certain patterns (e.g. signal strength patterns) are observed and are related to positions, which are then used either directly for position estimation or as input for distribution functions for more sophisticated results. While these techniques are less prone to measurement errors in ranges compared with the previous two categories, in most cases, however, a prior knowledge of the map and a careful design of to-be-sensed patterns are necessary, which may not be available or practical in certain wireless sensor networks.

Distributed Position Estimation for Wireless Networks

The present application describes a new distance-based architecture. Each node in this scheme can control its transmission power to discrete values. By varying its transmission power a node can discover its neighbors at discrete distances. Use of a coarse (quantized) distance measurement makes the scheme less environmentally sensitive than architectures which use more precise distance measurements as input. Each node then gathers distance information from immediate neighbors by voluntarily exchanging collected distance information with each other. The accuracy is compensated by each node aggregating distance information from its neighbors. A node then estimates its own position with respect to other nodes by applying Multidimensional Scaling (MDS) on the collected distance information.

Position estimates are refined in a progression which starts from some bootstrap nodes, and propagates gradually outwards to nodes further away. (At least some bootstrap nodes are preferably "landmark" nodes, which are preferably equipped with its own accurate position information. One example of less preferable method of getting its own accurate position information is via GPS). Note that accuracy in the context of position information is referring the fact that while a node aggregates distance information it will have distance information between more and more nodes by running, for instance, a shortest paths algorithm against the collected data. A bootstrap node then broadcasts its position along with relative positions of its immediate neighbors. The neighbors' positions are relative because they subject to rotation and reflection (but not translation). Each non-bootstrap node further collects reference positions of immediate neighbors reachable via a single hop by voluntarily exchanging position information with each other or by receiving bootstrap nodes' position broadcasting. When insufficient position information is collected, each node then employs a special polling approach to request its immediate neighbors for position information. Finally a non-bootstrap node employs MDS or some minimization algorithm to minimize the errors in estimation.

The actual complete position estimation employs refining steps. First, each general node re-orients its corresponding position relative to each of the bootstrap nodes, after receiving position updates from others and using them as reference points. Since after this step it will only have a couple of positions, each consistent with the corresponding bootstrap node, so the second refining step is to use such relative positions together with the positions of the bootstrap nodes to get the absolute position with a minimization equation, one example is defined in later section.

Contrary to angle-based and pattern-based techniques, this scheme does not require any special hardware, nor powerful base stations with overlapping coverage, nor pre-knowledge of the area of interest, nor recursive probabilistic processes. These differences, together with the fact that it is a distributed scheme and therefore spreads the computational stress over numerous nodes, make it very suitable for position estimation in a WSN setting.

While the scheme can also be used in other wireless networks, it is particularly suitable for wireless sensor networks. Advantages of various disclosed embodiments include one or more of the following:

It is robust against measurement noise and channel fading/interference since only imprecise (quantized) information on the distances is needed.

It is fast and not computationally intensive, since a node only needs information from its neighbors and only information about its neighbors is calculated.

It is bandwidth efficient as information is exchanged within nodes in proximity only and bandwidth-inefficient global flooding is avoided.

It is cost effective since only a few devices with GPS capability are required to have positions estimated consistent with the GPS coordinate space.

It is robust to handle joining/leaving nodes.

It is capable to handle lower power nodes which take a minimal part in the estimation process. And Finally, useful information for position-based routing is already embedded during the position estimation process, resulting in no or minimal extra transmission for efficient route determination.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 1 schematically shows how a Quantized Distance and Quantized Distance Vector are generated.

FIG. 2(*b*) shows how the bootstrap node constructs Distance Matrix from QDVs collected from its neighbors.

FIG. 6 shows an example of message formats used in QDV construction.

FIG. 7 shows an example of message formats used in position estimation.

FIG. 9 shows system parameters setup for simulation.

FIG. 12 shows the simulation results.

FIG. 13 shows accuracy measure for various densities.

FIG. 14 shows accuracy measure for various numbers of bootstrap nodes.

FIG. 15 shows accuracy measure for various quantization levels.

FIG. 16 shows accuracy measure for various mISOMAP threshold values.

FIG. 17 shows accuracy measure for various numbers of bootstrap nodes.

DETAILED DESCRIPTION OF THE PREFERRED EMBODIMENTS

Figure 2A:
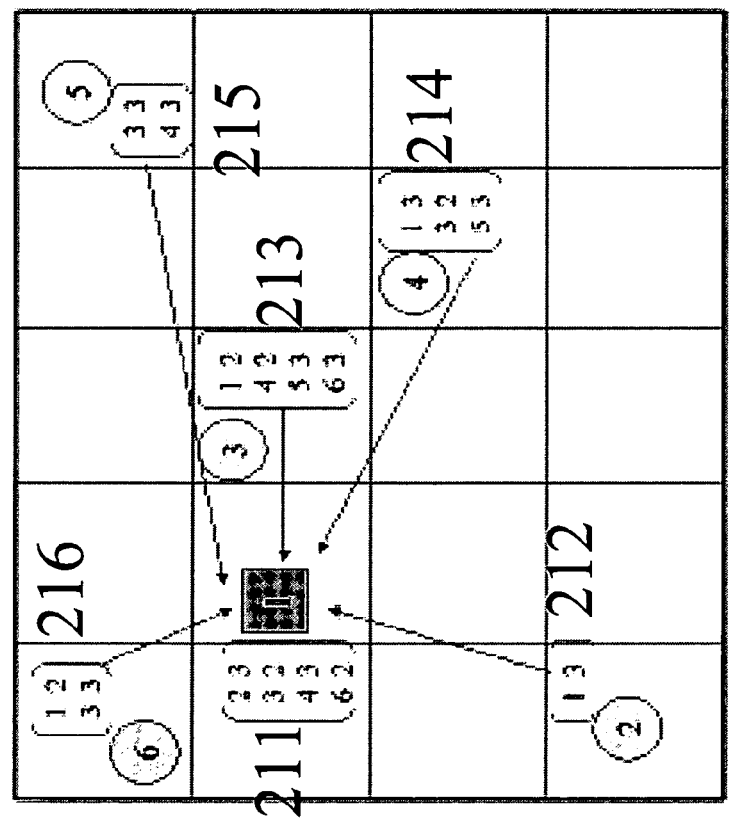
FIG. 2(*a*) shows an example of a bootstrap node collecting QDVs from its neighbors.

The numerous innovative teachings of the present application will be described with particular reference to the presently preferred embodiment (by way of example, and not of limitation).

A. Location Estimation

In the system, every node has a unique identifier (ID) and has a maximum transmission range R. In this embodiment the node is assumed to be able to adjust its power so that it can communicate with its neighbors at discrete distances away. For ease of discussion, it is further assumed that its coverage is represented by concentric circles with a step-wise increase in radius. Again for simplicity of discussion, the nodes here are limited to homogeneous nodes, i.e., they have the same transmission range R and the same levels of quantized distances. Note that this embodiment can easily be extended to handle other non-circle coverage shapes and heterogeneous nodes.

In FIG. 1 the distance discovery process for the square node with ID 1 is shown 101. FIG. 6 shows an example of the messages used in the sample embodiment. First, it sends out beacons with increasing discrete ranges (shown as concentric circles 130). In this example, 3 quantization levels are defined. The beacon message 610 contains the level 611 and polls the neighbors for reply. Based on the replies 620 from the neighbors, Node 1 then compiles a quantized distance vector (QDV) 120, which indicates the distance levels 122 between itself and its neighbors 121. The Since Node 3 is out of the range of Node 1, it cannot be detected and hence is not included 103. Details of message format is discussed at a later section.

Figure 2B:
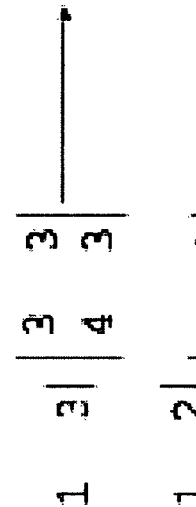

FIGS. 2(a)-(b) shows an example of how to construct a distance matrix. To estimate its position, a node first requests 630 and collects 640 a number of QDVs from its neighbors 212-216, and together with its own QDV 211 it compiles a distance matrix G 220. The entry $[d_{ij}]$ of the distance matrix G is the quantized distance between nodes i and j. Nodes which are unknown to each other (a node is outside of another node's transmission range) are denoted by a cross "x" 221, which are then estimated by a shortest path algorithm such as Dijkstra's algorithm.

This embodiment uses Multidimensional Scaling (MDS) to find the best nodal coordinates in two-dimensional Euclidean space that best satisfy all the pair-wise nodal distances. MDS is a component in the ISOMAP algorithm wherein data points lie in some high-dimensional space, and ISOMAP's goal is to find a low-dimensional embedding of these points such that their proximity/distance relationships can be best preserved. The obtained low-dimensional Euclidean space is then subsequently used for visualization or feature extraction in machine learning applications. This embodiment refers to an application of ISOMAP to derive 2-D position information as mISOMAP. Details of the ISOMAP algorithm are presented in later section.

In the sample embodiment, after resolving all the entries in the matrix G, a node uses MDS to find the best nodal coordinates. Note that the positions obtained from MDS may differ from the real positions by an arbitrary translation, rotation and/or reflection, as all these transformations would not alter the distance matrix. Note that the sample embodiment only discusses a special case in which both the data points (corresponding to the nodes) and the resulting embedding are in two-dimensional space, however this location estimation can be extended easily to the three-dimensional case by using MDS to find a three-dimensional embedding.

B. Distributed Algorithm

To facilitate our discussion, the following terms define are defined:

Position—coordinates with respect to some geometry planes. In this sample embodiment it is in two dimensional space and hence a position is represented as two values, namely, x and y.

Position update—the updated position of the issuing node, resulting from the position estimation performed by itself.

Embedding—a set of positions of a node's neighbors and itself. It is generated using the MDS.

Map—the set of positions of all the nodes in the system.

There are two types of nodes in the network: bootstrap nodes and general nodes:

Bootstrap Node

Figure 3:
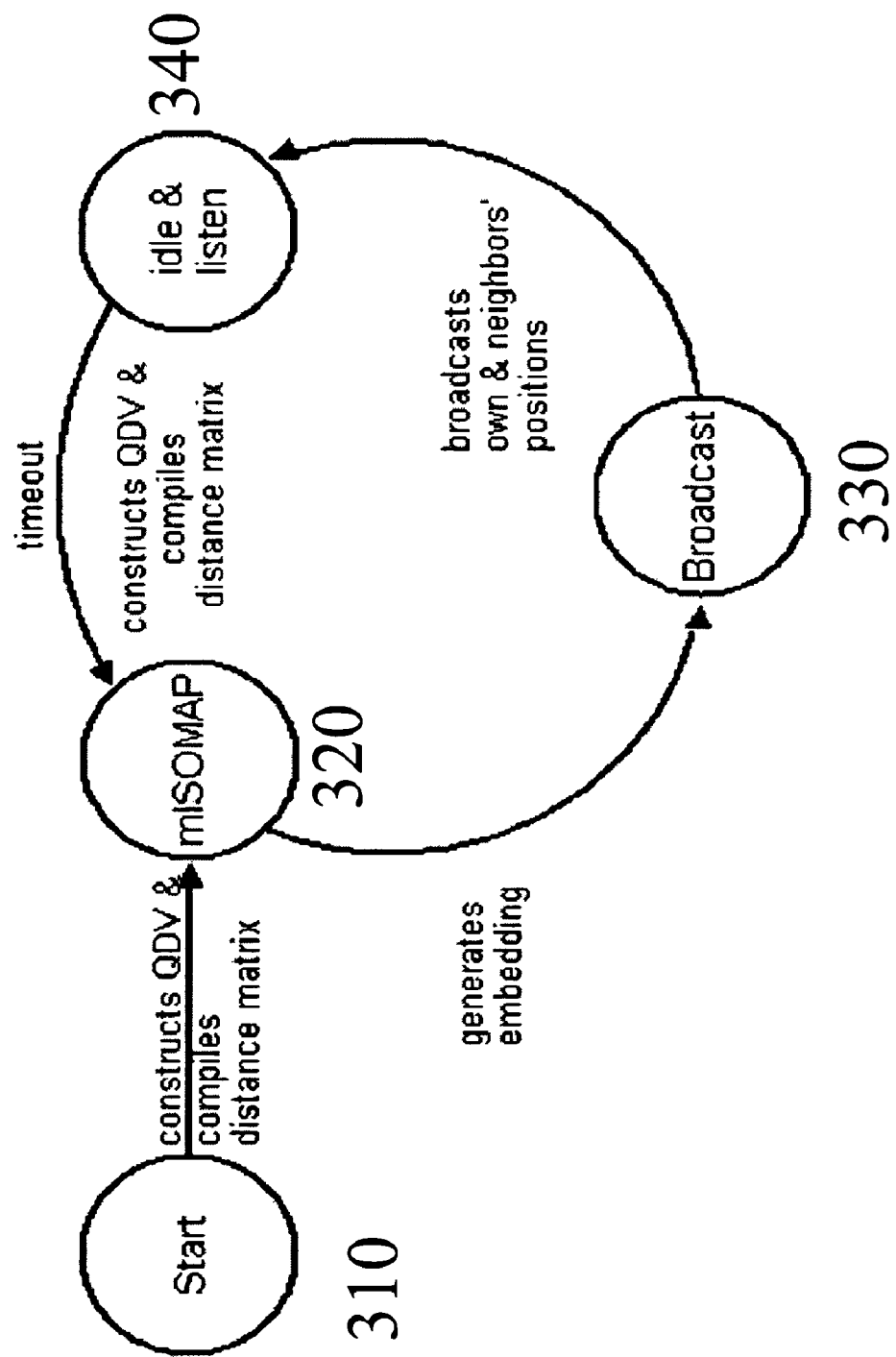
FIG. 3 shows an example of a Finite State Machine of a bootstrap node.

In this sample embodiment, a bootstrap node differs from a general sensor node in that it knows its own position (e.g. equipped with GPS capability) and it processes the position information differently. FIG. 3 describes the states and steps that the bootstrap undergoes during the estimation process. Based on the QDVs collected, a bootstrap node triggers the estimation process by first computing the positions (in the form of an "embedding") of its neighbors using the aforementioned algorithm 320, and then broadcasts its own and neighbors' positions 330. FIG. 7 contains an example of the message 710 used for the broadcast. After that it sleeps for a period of time 340. When a timeout occurs it repeats the process of constructing and collecting QDVs, performing the algorithm 320, and broadcasting the results 330. This timeout mechanism is to facilitate the joining/leaving of general nodes.

General Node

Figure 4:
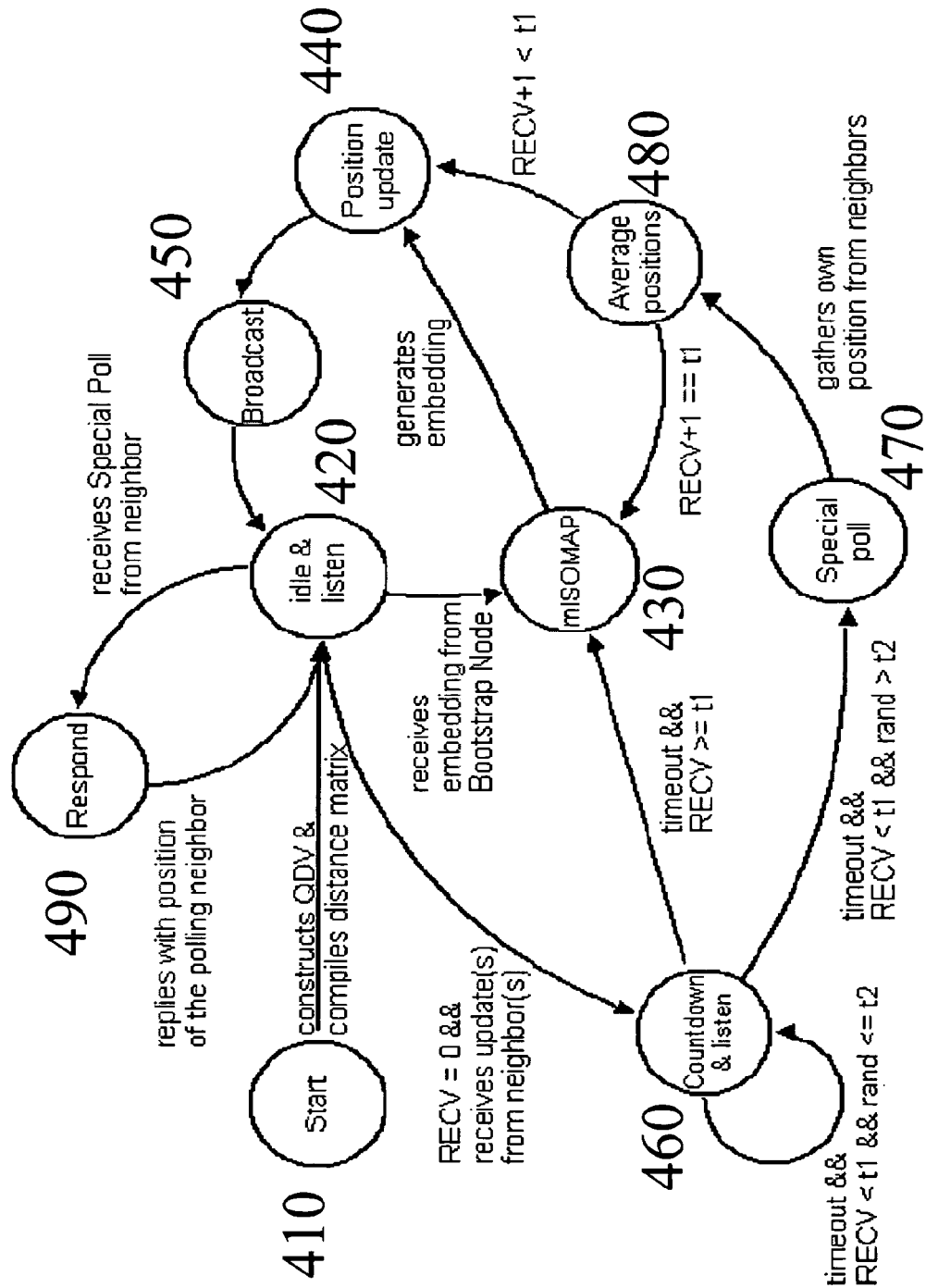
FIG. 4 shows an example of a Finite State Machine of a general node.

In this sample embodiment, a general node does not know its own position initially and has to estimate that itself. FIG. 4 describes the states and steps that the general node undergoes during the estimation process. After constructing and compiling its own QDV and distance matrix, a general node first becomes idle and listen for position updates from its neighbors for a period of time 420. FIG. 7 contains an example of the message 720 used for the position update. If it is a direct neighbor of a bootstrap node and receives an embedding from it, the node directly generates its own embedding 430 and updates its position 440. If it receives an update from its non-bootstrap neighbors, it increments a variable "RECV" by one 460. The position updates are used as reference points for transforming the locally generated embedding into one that is consistent with the one generated by the bootstrap node. Although in theory for a 2-D space three reference points are sufficient to uniquely define a transformation, experiments show that at least double of such points are required for good results. This is mainly due to the fact that very often the embedding generated contains errors resulting from imprecise inputs.

Depending on this "REVC" value when the node receives a position update it starts a count down waiting for additional updates and stays listening till a timeout has occurred. When a timeout occurs, one of the following two scenarios will happen:

1. it receives position updates (amount indicated by "RECV") from less than a threshold t1 number of neighbors or
2. it receives position updates from more than or equal to a threshold t1 number of neighbors.

There are two situations leading to the first scenario: (1) not enough neighbors are present to provide position updates, and (2) timeout occurs prematurely. For the first situation the node would issue a special poll 470 (also see 720 for special poll request message and 730 for special poll reply message) asking its neighbors for its position, and averaging them to get the estimate of its own position 480. For the second situation, however, the node should choose to wait longer to collected more position updates. Since the node cannot wait indefinitely, there is no way for it to distinguish between these two situations when a timeout occurs. Therefore a threshold value t2 is used for making the decision of keep waiting 460 or move on to issuing a special poll 470. After the threshold value t1 is reached, it will generate its own embedding 430 (either from 460 to 430 or from 480 to 430).

In the second scenario, which is the most probable one, the node will perform mISOMAP to estimate its own position 430.

In any cases, when a general node has its position updated 440, it broadcasts the new result to its neighbors 450.

Figure 5:
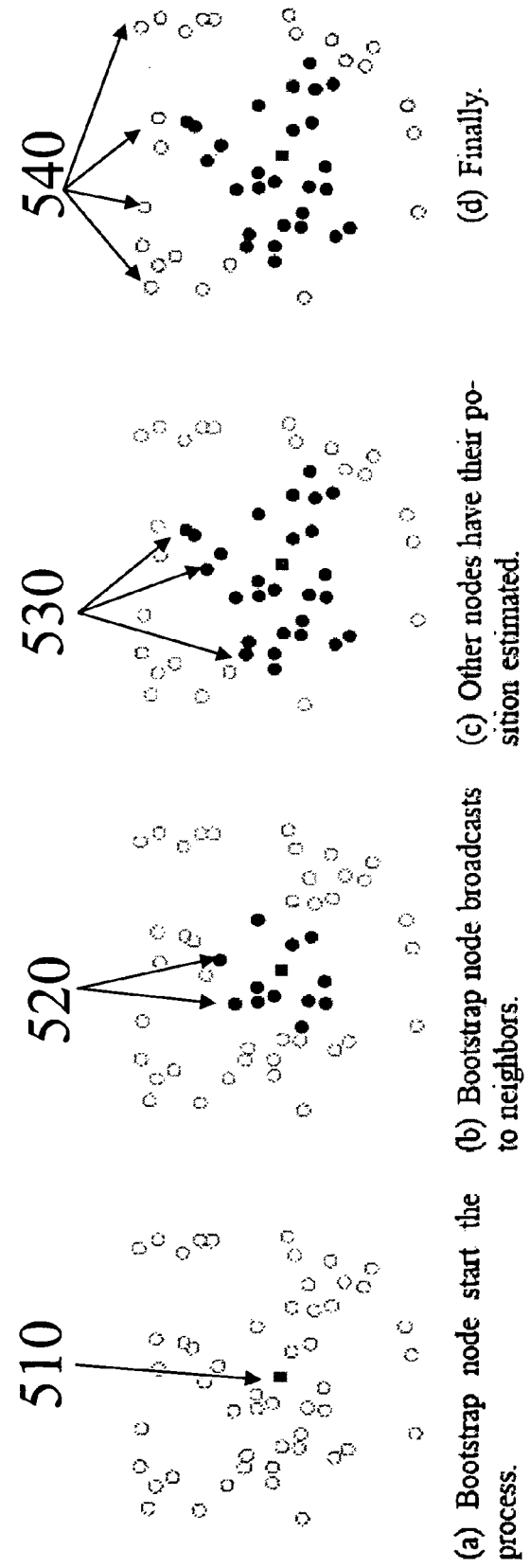
FIG. 5 shows an example of position information propagation in a network composed of a single bootstrap node and plurality of general nodes.

FIG. 5 demonstrates the estimation process for a particular bootstrap node. The square 510 is the bootstrap node and the circles 520, 530 & 540 are the general nodes. The node is shaded if it has its position updated. In the beginning, the bootstrap node 510 collects QDVs from its neighbors and computes the positions of all the nodes in the matrix G by the aforementioned estimation algorithm (FIG. 5(a)). The bootstrap node then informs its neighbors their computed positions as shown in FIG. 5(b). Nodes receiving the broadcast then update their own positions 520. As for the other nodes, once they receive a certain number of their neighbor positions via broadcasting, they 530 compute their own positions by the estimation algorithm and transform the computed positions using those from their neighbors (FIG. 5(c)). As a result, the newly computed positions share the same translation, rotation and/or reflection as the bootstrap node. Note that during the estimation process nodes other than the bootstrap node will only send out their own updated positions, as opposed to sending all of the computed positions, which is only performed by the bootstrap node. This greatly reduces the length of the message being transmitted, and hence consumes less bandwidth and power. It is clear that the number of nodes knowing their positions increases as the process is repeated, until the whole network is covered (FIG. 5(d)).

While it is possible to have a single bootstrap node for the entire network, however, estimation error tends to accumulate as the estimation is performed by nodes further away from the bootstrap node. Further, a single bootstrap node may result in a map subjected to an arbitrary translation, rotation and/or reflection. It is therefore desirable to have multiple bootstrap nodes distributed in the area. Note that this increase in number of bootstrap nodes is only a very small amount as compared to the plurality of general nodes. As a matter of fact, position estimations from each of the multiple bootstrap nodes can be used by a node to estimate its position $p_x$ more accurately and even consistent with the GPS coordinate space by performing another mISOMAP algorithm, or simply minimizing the following objective function based on those position estimations:

$$\sum_{i=1}^{L} (\|p_x - p_{L_i}\| - d_{xL_i})^2,$$

where L, $p_{L_i}$ and $d_{xL_i}$ are the number of bootstrap nodes, the position of bootstrap node i and the distance from the node to the bootstrap node i is calculated by using the position estimation from the bootstrap node i, respectively.

The procedures of the position estimation scheme are summarized as follows:

Construction of QDVs
Each node constructs its own QDVs.
Bootstrap nodes
The distributed algorithm begins with the bootstrap nodes collecting their neighbors' QDVs by a broadcast request and compiling them to a distance matrix. Then they perform the mISOMAP estimation algorithm and informs their corresponding neighbors about the computed positions through a broadcast. This process will repeat itself to start a new estimation process to facilitate possible network dynamics.
General nodes
If a general node receives its position from a bootstrap node, it stores its new position and directly performs the mISOMAP estimation algorithm. Otherwise it waits for more position updates, and then either uses the received updates as input or issues a special poll to estimate its position. Once it has its position updated, it sends the updated position to its neighbors via a broadcast. After receiving positions from bootstrap nodes, it also refines its position estimation by performing a minimization algorithm.

The algorithm can be extended to networks with limited degree of mobility, as re-computations of positions are triggered periodically by the bootstrap nodes.

C. Message Types

Messages used for position estimation are listed and put into two general classes: QDV construction and position estimation. In the sample embodiment only the necessary fields for each of the message types were considered without going into great details. Their actual design and implementation depend on the actual deployment of the network. The following defines the fields of the message types illustrated in the example in FIG. 6 and FIG. 7:

Msg Type: indicates the type of the message
Source Node ID: indicates from which node the message is sent
Reply To Node ID: indicates to which this message is sent
Distance Level: indicates for which distance level the message is
Identifier: associates information to the corresponding node
Position records: coordinates of the node to which it associates by the identifier
Seq Number: indicates number of position estimation processes a bootstrap node has triggered D. Complexity Analysis In the sample embodiment, the estimation algorithm starts with a Dijkstra's algorithm to complete the distance matrix. For a matrix of size m×m it takes O(em log m) time, where e is the number of edges covered in the matrix. Then MDS is performed for each of the bootstrap nodes, with a total computational complexity of $O(DBm^2)$, where D and B are the number of dimension of embedding and number of bootstrap nodes, respectively. Finally, an O(B) minimization algorithm is used to output the refined position.

Suppose the maximum number of neighbor a node has is M, then in each node the algorithm is performed with at most M nodes and the dimension of embedding is at most three, the overall computational complexity for each node is therefore $O(BEM \log M + BM^2 + B)$, where E is the number of edges among the nodes.

E. Scheme Limitations

The major source of such limitations is the erroneous distance measurements. First, since distances are measured in a quantized manner, the distance information as input for the mISOMAP algorithm are imperfect, resulting in erroneous embeddings. In the sample embodiment this discrepancy could be compensated by aggregating QDVs from neighbors and by having a higher threshold value for performing the mISOMAP algorithm for each node. This however requires a certain amount of neighbors, and hence a certain density. In order words, a good performance would require a moderately high density of nodes (around 20 to 40 neighbors within the radio range of each node).

Secondly, the distance measurements in the sample embodiment involve a conversion from a particular power level to a corresponding distance. This conversion is subjected to environmental changes. Therefore, onsite calibration has to be made. A possible way to get around this limitation is to have some other ways of estimating distances between nodes, but this may come with the price of added overhead like clock synchronization.

F. Joining and Leaving Nodes

One very common use of wireless sensor networks is to monitor an environment. Quite often after the monitoring sensor network is set up one may want to increase the density of nodes for a finer-grain measurement. The new nodes are considered as nodes joining the network. On the other hand, it is possible that after some time of service some nodes will stop functioning, either due to out of battery or even failure. The ceased function nodes can be considered as nodes leaving the network.

The embodiment proposes periodic timeout and re-computation in the bootstrap nodes as well as the broadcasting of updated positions of general nodes. Those features enable the handling of joining/leaving nodes. As a node joins the network, it first constructs its own QDV with its neighbors, and hence becomes part of the network. It then functions like any other existing nodes and takes part in the estimation process. For a leaving node, it simply stops the re-computation and broadcast steps, leaving the network unaffected.

G. Low Power Nodes

Figure 8:
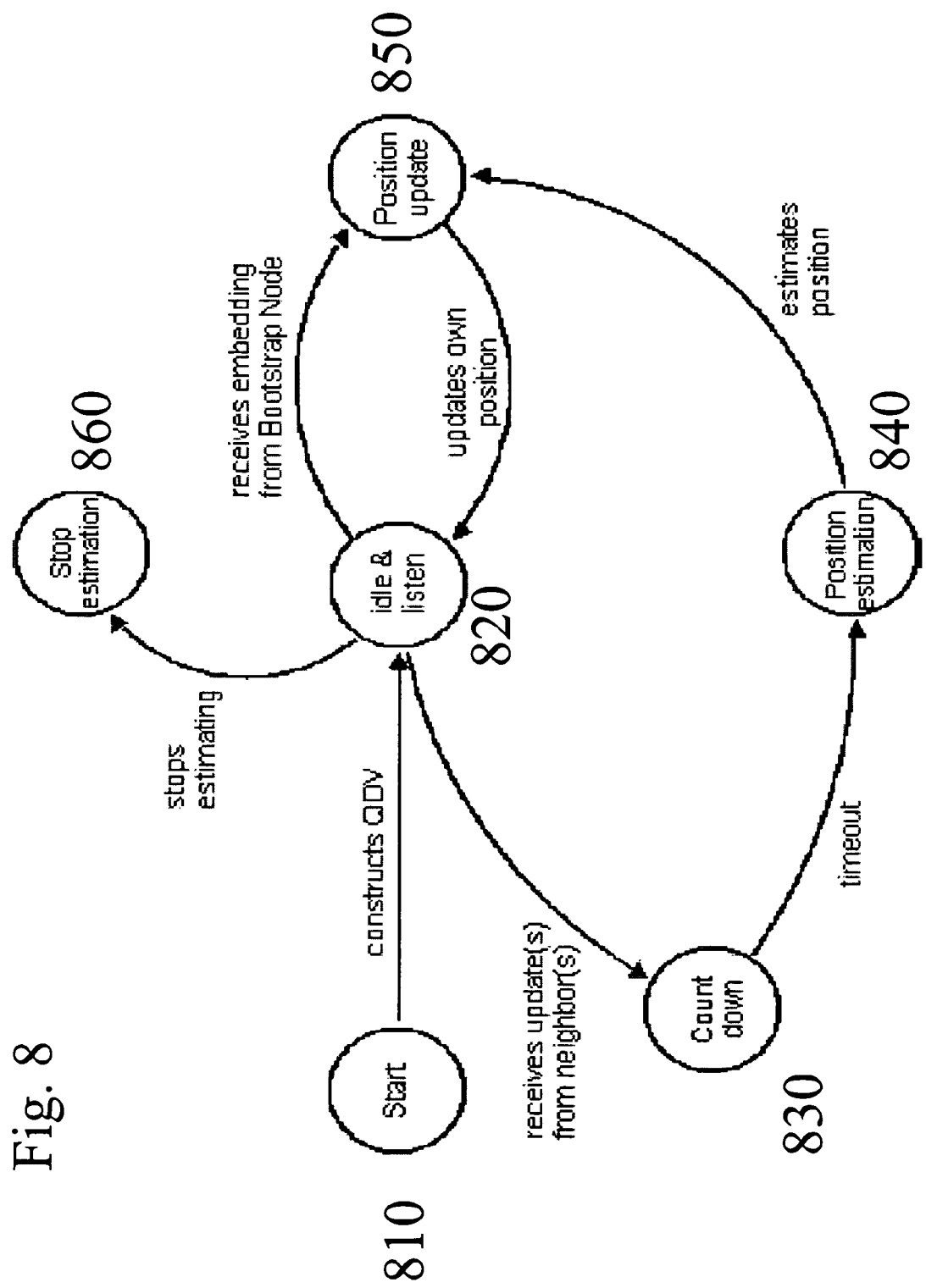
FIG. 8 shows an example of a Finite State Machine of a lower-power node.

In a sensor network where there are hundreds of nodes, it is possible that some of them become low in power, either due to battery wear out or even failure. In such cases a node may not be able to take part in the estimation process as actively as other nodes. It is still desirable for them to perform some important tasks, they could reduce power loss by becoming passive in the estimation process. FIG. 8 describes the states and steps undergone by a low power node in estimating its own position. The node can stop the process at anytime once it has derived its estimated position. Again, it constructs its own QDV with its neighbors as normal nodes do. Unlike the normal nodes, however, a low power node does not broadcast the position update. This would greatly reduce the energy consumption since wireless transmission is a major source of energy consumption. To further reduce the energy consumption, instead of performing the O(em log m+m$^2$) mISOMAP algorithm to estimate its position $p_x$ a low power node would simply employ the O(Bm) minimization algorithm similar to the estimation refinement step in normal node given by $$\sum_{i=1}^{N} (\|p_x - p_{N_i}\| - d_{xN_i})^2,$$

where N, $p_{Ni}$ and $d_{xNi}$ are the number of the node's non-low power neighbors, the position of the non-low power neighbor node i and the quantized distance from the low power node to this node i stored in the nodes QDV, respectively.

A sensor node may also choose to become "low in power" even when it is not in low battery state. An example is having a "duty cycle" in a sensor node, which allows sensor nodes to take turns to save their power, thus extending the service lifetime of the entire network. In other words, when this "duty cycle" strategy is employed in the position estimation process, sensors nodes can take turns to become "low in power", thus extending the lifetime for both position estimation and the designated tasks of the WSN.

H. Routing Issues

Position-Based Routing

One possible application of the scheme is position-based routing in which nodes deliver packets based on the positions of the source and destination. Countless work has been done to address the issues of route determination for a network of numerous wireless nodes, such as GPSR, GRA and many others. Common to all position-based routing techniques is that they require three pieces of information in each node to determine the next hop in a route: 1) position of the current node, 2) positions of the direct neighbors of the current node and, 3) position of the destination node. In the sample embodiment, given the position of the destination node, a node does not require any extra transmission to determine its next hop to route the data because during the estimation process the positions of its neighbors has already been received by this node for embedding generation.

One possible way to make use of such information is by employing a greedy algorithm. As an illustration, a packet is being transmitted from the source node S to the destination node D. First, node S could obtains D's coordinates by using, for example, distributed hash tables or information exchanges during the position estimation process. Node S then examines the coordinates of all its neighbors, and forwards the packet to the one closest to node D. Each node performs the same forwarding until the destination is reached.

The objective of deciding a route varies with the application type. There are a number of possibilities: minimum distance, minimum power, minimum hop, etc. While methods aiming at minimizing Euclidean distance result in a shorter transmission distance, they may incur more hop counts, and a global knowledge may be required. On the other hand, although methods aiming at minimizing hop counts can reduce forwarding requests and global knowledge may not be required, they tend to result in a longer transmission distance. Thus there may be a trade off between transmission distance and forwarding hop counts, and it is up to the actual deployment of a sensor network to decide which is more suitable. The scheme proposed in the sample embodiment is flexible enough such that it allows user to choose the desired objective function or even to use a combination of them.

Sink-Routing

Sink-routing is a special case of routing which is very common in WSNs. In Sink-routing every node knows which neighbor to send to when it reports useful data collected, and eventually the data reaches a sink node. This is particularly useful when the sensor network is used to monitor an area. When a sensor node collects the required data, it can then send the data to the sink node via an efficient path instead of randomly forwarding the data. The challenge is that each sensor node does not have the knowledge of the positions of all the other nodes. What a sensor node can only do is to determine a neighbor node to send such that the data would reach the sink node efficiently. The scheme proposed in this sample embodiment is particularly suitable for this sink-routing case. One of the bootstrap nodes can be setup. Since the bootstrap node's position is broadcasted in embedding and position updates, there is no need to issue additional requests for neighbor positions as well as for obtaining the sink node's position.

Sink-routing can be extended from a single sink node case to a multiple sink nodes case, which would help alleviating the bottleneck problem on a single sink node, and make the system less prone to single point of failure. To achieve this, simply set the multiple bootstrap nodes as sink nodes, and then each reporting node chooses, or is assigned to, a sink node to "attach to".

I. Simulations

Simulation in this sample embodiment assumes that each node has a restricted transmission range (R) of 10 units, the general nodes' (blue circles/crosses in the figures) coordinates are randomly generated in an enclosed 100×100 square area and nine bootstrap nodes (red squares in the figures) are manually put at different places in the same area. The bootstrap nodes are deliberately put at places where their transmission ranges do not overlap with each other to demonstrate the fact that overlapping coverage is not necessary in the scheme.

The density is the number of nodes per unit square of area. FIG. 9 summarizes the system parameters used in the simulation. To evaluate the overall performance, the most common practice is to evaluate its accuracy. Here the accuracy is evaluated by using two forms of distance error: actual distance error and relative distance error. A smaller value of error indicates better accuracy.

Actual Distance Error

Actual distance error is the distance between a node's estimated position and its real position. It is particularly useful for location-specific applications as the true positions of the nodes relate to the performance directly. To facilitate the evaluation of this metric, the node's maximum radio range is normalized. Thus, for a node i, the normalized actual distance error (A), is defined as $$\lambda = \frac{\|p_x - p'_x\|}{\text{maximum radio range}},$$

where $p_x$ and $p_x'$ are its estimated position and true position respectively.

Relative Distance Error

Relative distance error, on the other hand, is a measure of relative internodal distance error between a pair of nodes. It is useful for cases where relative position estimation is sufficient, like position-based routing. This is because the aim of relative position estimation is to preserve inter-nodal distance, which is subjected to (but not affected by) arbitrary translation, rotation and/or reflection. The relative distance error ($\gamma$) for every pair of nodes i and j is defined as $$\gamma = \left\|\frac{\text{measured distance} - \text{true distance}}{\text{true distance}}\right\|.$$

Position Estimation

Figure 10:
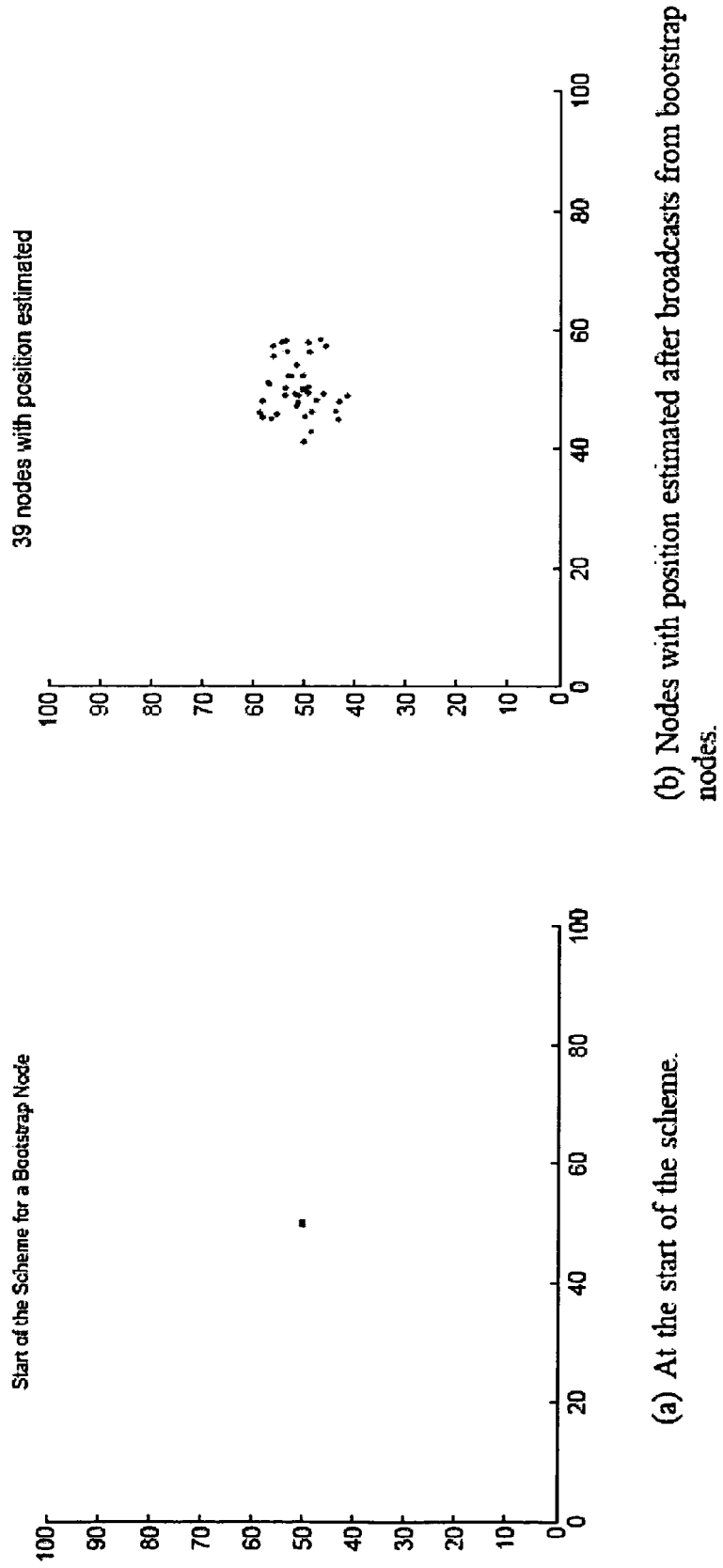
FIG. 10 illustrates the spreading coverage behavior of nodes with position estimated for a particular bootstrap node.
Figure 10:
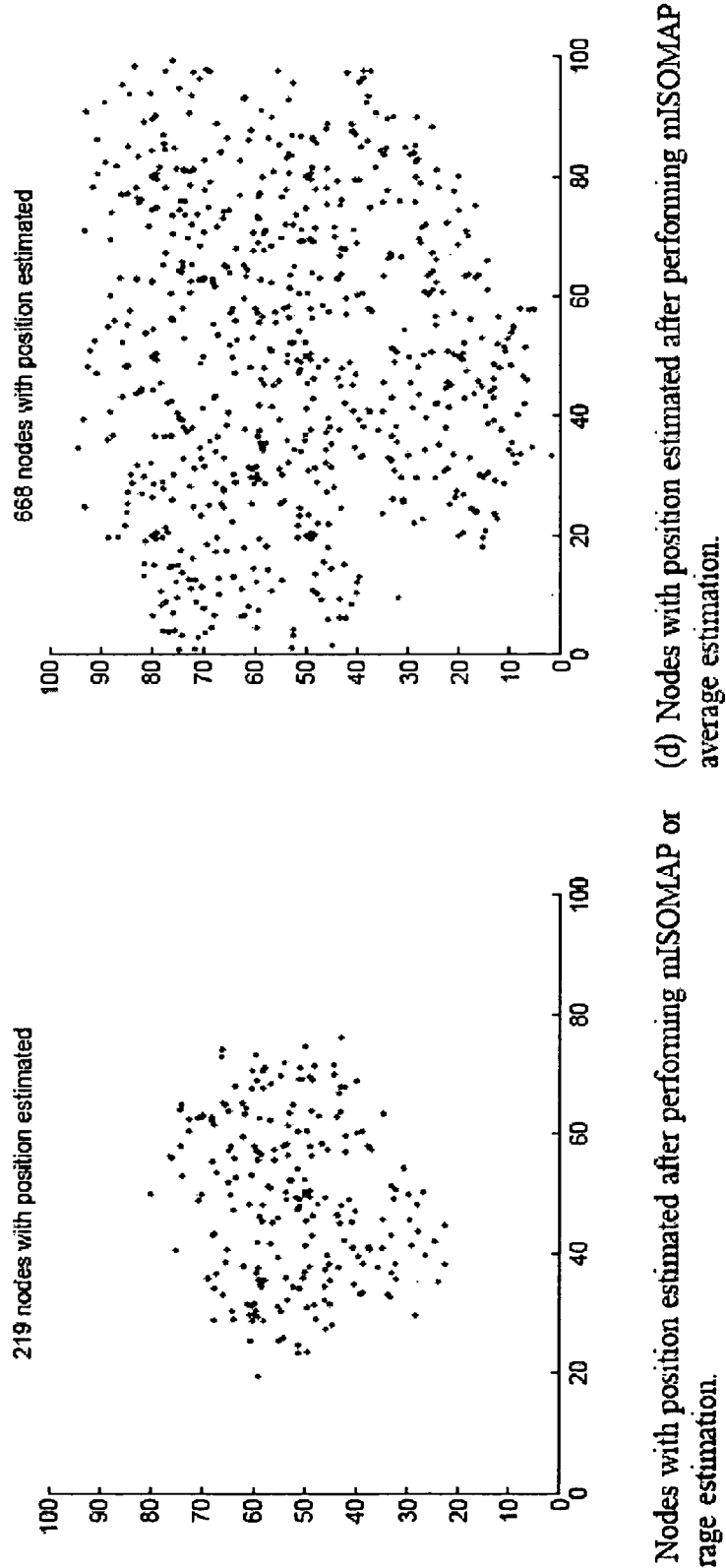
Figure 10:
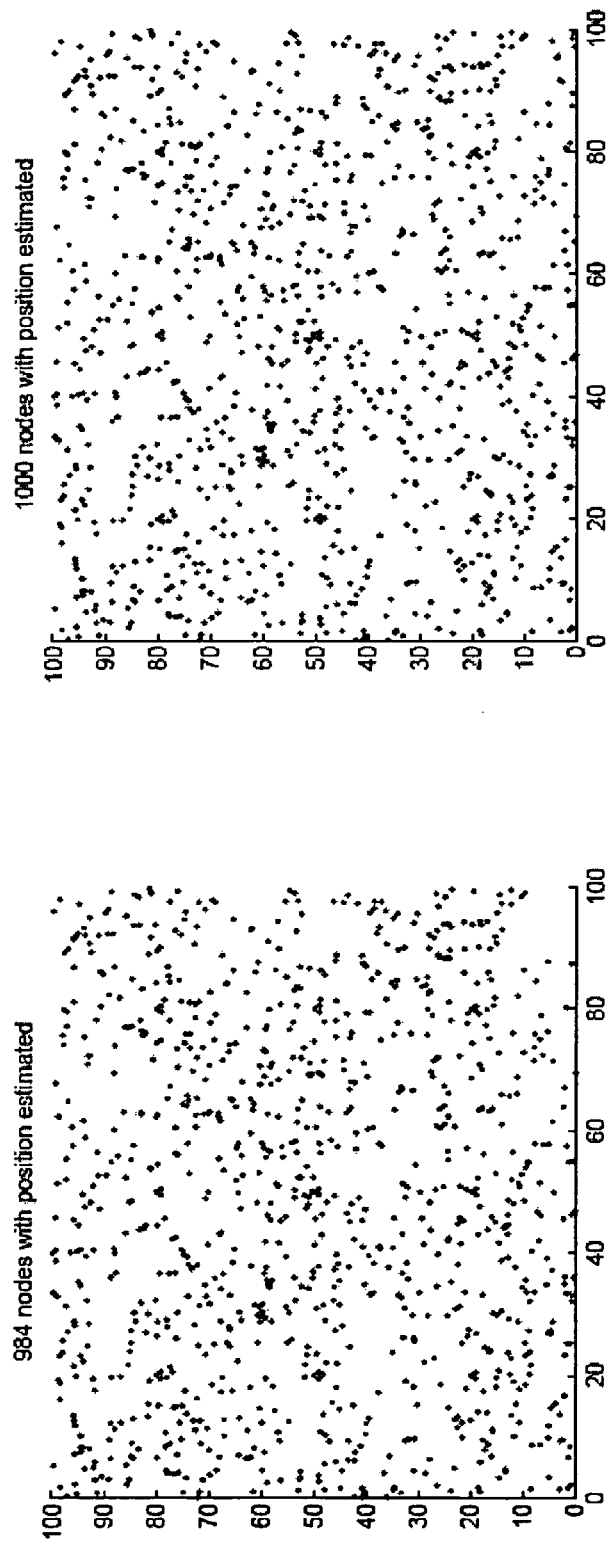

In this section we present the general behavior of our scheme such as the spreading coverage of position updates and estimation results. According to various disclosed embodiments, the scheme works like ripples spreading from bootstrap origins. In order to estimate its own position, a general node either uses the position updates from their neighbors and performs the mISOMAP estimation algorithm, or issues special polls and performs the averaging calculation. Thus each general node receives information from the bootstrap nodes either directly or via position updates from its neighbors. It then combines the information to estimate its position. FIG. 10 illustrates the spreading coverage behavior of nodes with position estimated for a particular bootstrap node. The direct neighbors of the bootstrap nodes are the first general nodes having their position estimated as they receive the broadcast from their bootstrap neighbor (FIG. 10(b)). For each of the other general nodes, when a timeout occurs and it chooses to estimate its position, it performs the algorithm or calculation and becomes part of the spreading coverage (FIGS. 10(c) to 10(e)). Eventually all the general nodes have their positions estimated relative to that bootstrap node (FIG. 10(f)).

Figure 11:
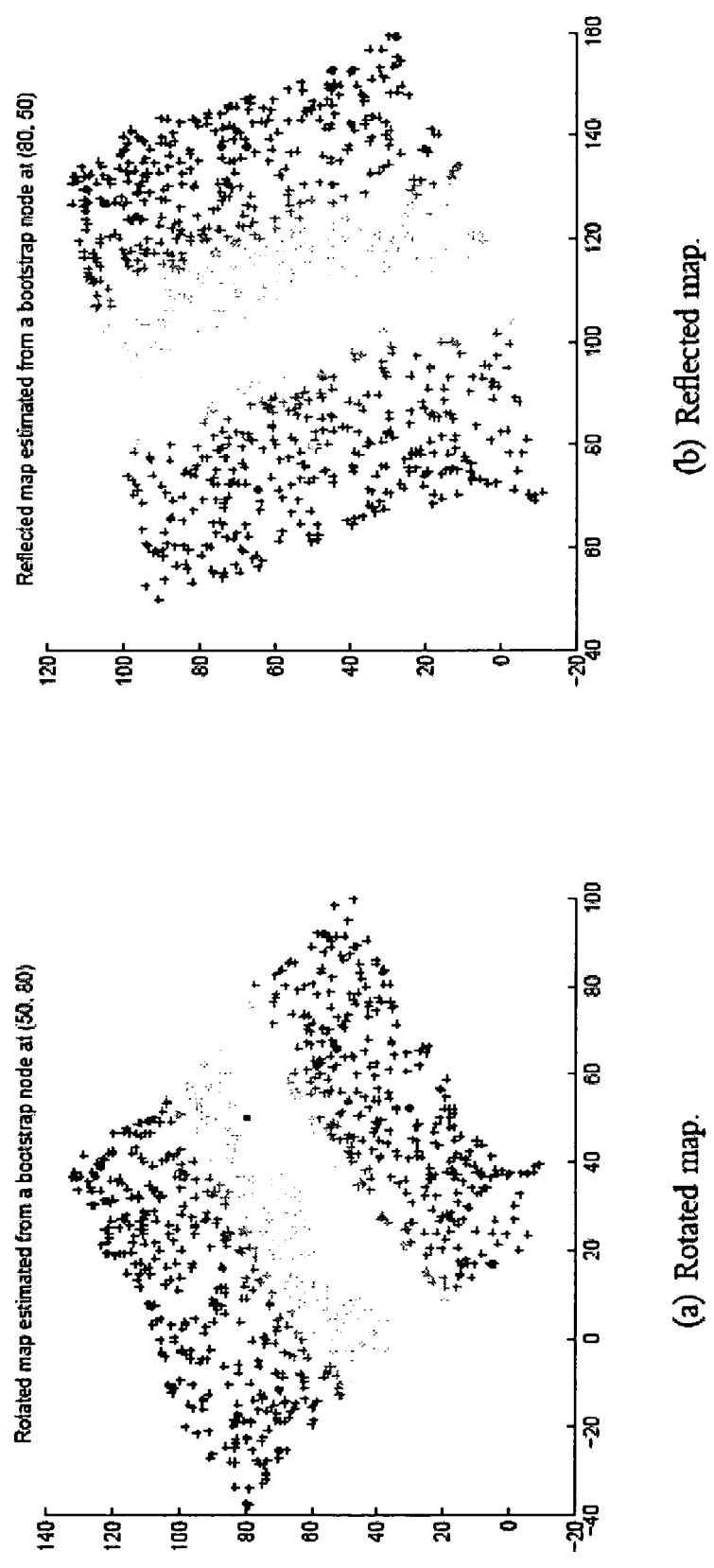
FIG. 11 show the rotation and reflection of positions estimated for a particular bootstrap node.

According to various disclosed embodiments, maps generated using a single bootstrap node may be subjected to an arbitrary translation, rotation and/or reflection. Using the already known position of the bootstrap node eliminates the translation, but not rotation and reflection. FIG. 11 shows two examples of transformed maps resulting from a single bootstrap node. Nodes are colored to highlight the transformations. Note that the general shape of the map is preserved, regardless of the transformations.

FIG. 12 shows both the real and estimated positions of the nodes after the refinement step. Note that after the refinement step the map of the estimated positions is consistent with the map of the real positions with no translation, rotation and/or reflection. Further, nodes closer to the center part of the map have the best estimations, as they receive information coming from various bootstrap nodes with smaller distances. On the other hand, nodes at the peripheral have estimations slightly off their real positions. This is because information coming from distant bootstrap tends to deteriorate. Nevertheless, both the absolute and relative errors are kept very low (several units only), which are reflected by the fact that the general shape of the map is preserved.

Parametric Variations

Dependence on several system parameters are varied was also investigated. In particular the following system parameters were studied: density, number of bootstrap nodes, number of node's quantization levels and threshold for performing position estimation. For each of the parameters a controlled mechanism, without using the mISOMAP algorithm, is used for comparison. The controlled mechanism obtains positions by exchanging distance information among nodes in terms of QDVs and using distance vector algorithm (shortest paths) for distance measurement. FIGS. 13(a) and 13(b) show that as density increases the error rate tends to increase as well. This is because there exists some errors when a node estimates its position, and these errors will accumulate as more nodes estimate their positions. However, the error rate is kept relatively small for a large network and the scheme proposed in the sample embodiment performs better than that of the control mechanism.

FIGS. 14(a) and 14(b) illustrate the change in accuracy of position estimation as the number of bootstrap nodes in the system varies. As expected, increasing the number of bootstrap nodes improves the accuracy. Note that as the number of nodes increases the scheme performs markedly better than the control mechanism, which shows greater fluctuations in terms of relative distance error. The scheme, on the other hand, performs well in preserving relative distance error even when the number of bootstrap nodes is small. Also, the curve for actual distance error flattens towards the end of the figure, indicating that there would not be significant improvement even if the number of bootstrap nodes is increased further. This suggests that it is not necessary to have numerous bootstrap nodes with position known beforehand (e.g. via GPS), and only a small amount (9 out of 1000 in this simulation) is required for good accuracy.

Quantization level is the number of discrete distance levels a node has to represent distances from its neighbors to itself. A higher value of the quantization level means the distance information is more precise, while a lower value of it means the distance information is coarser.

As shown in FIGS. 15(a) and 15(b), in general, the more quantization levels a node has, the more accurate the system is, since more precise distances are used for position estimation. However, this comes with a cost of better hardware requirement. The scheme achieves accuracy comparable to that of the control mechanism, and stabilizes for values greater than four, meaning that it works equally well even with imprecise distance measurements.

In the sample embodiment, the mISOMAP threshold value t1 is used by a node to compare with the number of position updates from its neighbors for deciding whether to perform the mISOMAP algorithm or otherwise. From the results shown in FIGS. 16(a) and 16(b), an increase in the threshold value results in a decrease in both of the error rates, and when it is increased to a certain value, the scheme performs better than the control mechanism, which is not affected by this value. There, however, exists a trade-off between accuracy and coverage speed of nodes with position estimated for deciding the mISOMAP threshold. While increasing this value can achieve a better accuracy, nodes will have to wait for more position updates before it can perform the mISOMAP algorithm using the updates.

Presence of Low Power Nodes

According to various disclosed embodiments, passive nodes do not take an active part in the position estimation process and their positions are estimated by a simple minimization algorithm using their normal neighbors' position. From FIGS. 17(*a*) and 17(*b*) the increases of the number of low power nodes will lead to no significant degradation in the accuracy of the system. This is because even the low power nodes construct QDVs with others so the normal nodes would be able to compile a complete distance matrix with all of their own neighbors. However, there is a slight hint of increase in the error rate due to the fact that no position updates would be sent from the low power nodes, resulting in less information for the normal nodes to perform the mISOMAP algorithm.

Modified ISOMAP ("mISOMAP")

A modification of the underlying machine learning tool called ISOMAP technique is used in the sample embodiment. It involves three major steps: 1) Construct Neighborhood Graph; 2) Compute Shortest Paths; 3) Construct m-dimensional embedding. When applied in the sample embodiment, the first two steps are performed upon the distance information, and in the third step classical multidimensional scaling (MDS) is employed (with m=2 for two-dimensional space) and is reviewed briefly in below: Given a set of n points $\{x_1, \ldots, x_n\}$ in Rm, these can be collected together in a n×m matrix $X=[x_1, \ldots, x_n]^T$, where $x^T$ denotes the transpose of x. The (Euclidean) distance between any two points $x_i$ and $x_j$ can be computed as $$d_{ij}^2 = \|x_i - x_j\|^2 = x_i^T x_i + x_j^T x_j - 2x_i^T x_j. \quad (1)$$

Assume that the mean $\bar{x} = \sum_{i=1}^{n} x_i$ is zero (realized by having the origin at the "center of gravity"), then $$\frac{1}{n}\sum_{i=1}^{n} d_{ij}^2 = \frac{1}{n}\sum_{i=1}^{n} x_i^T x_i + x_j^T x_j, \quad (2)$$

$$\frac{1}{n}\sum_{j=1}^{n} d_{ij}^2 = x_i^T x_i + \frac{1}{n}\sum_{j=1}^{n} x_j^T x_j,$$

$$\frac{1}{n^2}\sum_{i,j=1}^{n} d_{ij}^2 = \frac{2}{n}\sum_{i=1}^{n} x_i^T x_i.$$

Putting these back into (1), we obtain the inner product between $x_i$ and $x_j$ as where $D=[d_{ij}^2]_{n\times n}$, $D_j=[d_{ij}^2, \ldots, d_{ij}^2]^T$, and 1 is the n-dimensional vector with all ones. Define the matrix $M=[M_{ij}]d_{n\times n}$, then (2) can be written in matrix form as $$M = -\frac{1}{2}\left(D - \frac{1}{n}11^T D - \frac{1}{n}D11^T + \frac{1}{n^2}11^T D11^T\right)$$

$$= -\frac{1}{2}HDH,$$

where $$H = I - \frac{1}{n}11^T$$

(known as centering matrix), and I is the n×n identity matrix.

Note that M is positive semi-definite. Consider the eigendecomposition $$Mv_k = \lambda_k v_k,$$

where $\lambda_k$ is the kth largest eigenvalue and $v_k$ the corresponding eigenvector. Assuming that m≦n, then M has m non-negative eigenvalues. Define $\hat{} = \mathrm{diag}(\lambda_1, \ldots, \lambda_m)$ and $V=[v_1, \ldots, v_m]$. Then, $$M = V \Lambda V^T$$

$$= \left(V\Lambda^{\frac{1}{2}}\right)\left(V\Lambda^{\frac{1}{2}}\right)^T.$$

The coordinates of xi can thus be obtained from $(\sqrt{\lambda_1}v_1, \ldots, \sqrt{\lambda_m}v_m)^T$. This may be different from the actual coordinates by an arbitrary translation, rotation and reflection. Finally, the complexity of solving the eigensystem is $O(n^3)$ and storage is $O(n^2)$.

According to various disclosed embodiments, there is provided:

1.

According to various disclosed embodiments, there is provided a method for collectively generating positional information in a plurality of nodes, comprising the actions of: a) in individual ones of said nodes, generating information of distances to other nodes, including at least some distances obtained from neighboring nodes; b) in at least one bootstrap node, generating a spatial embedding which is consistent with the respective distance information at said bootstrap node, and propagating said embedding to others of said nodes; c) in at least some non-bootstrap nodes, receiving position values for neighboring nodes, updating an estimate of said node's own position if needed, and propagating said node's own position.

According to various disclosed embodiments, there is provided a method as above, in which said action of generating information of distances to other nodes comprises, at a respective node, the actions of: said node broadcasts some signal with its own ID at a certain power level; receiving nodes reply to the broadcasting with their own IDs; for each said reply, said respective node derives information of distance; and: said node refines distance information based on collected distance information.

According to various disclosed embodiments, there is provided a method as above, in which said action of generating information of distances to other nodes derives distance information from the existing routing table.

According to various disclosed embodiments, there is provided a method as above, in which said action of generating information of distances to other nodes uses only coarsely quantized distance information from the existing routing table.

According to various disclosed embodiments, there is provided: A peer-to-peer network, comprising: a plurality of nodes which each have short-range communication capability and at least one instruction-executing device; at least some ones of said nodes being configured to discover neighboring nodes, construct a rough measure of distance to said neighboring nodes, construct a table of said rough measures, exchange tables with at least some ones of said neighbors, and thereby generate an approximation of the node's position with respect to said neighboring nodes; at least some ones of said nodes being configured to correct and transmit said approximation when an updated map of node positions in received; whereby said nodes collectively converge to a map of positions of all said node.

According to various disclosed embodiments, there is provided a network as above, in which at least some ones of said nodes are sensor nodes which sense environmental data.

According to various disclosed embodiments, there is provided a network as above, in which some of said nodes are sink nodes which export data from the network.

According to various disclosed embodiments, there is provided a network as above, in which some of said nodes are boot nodes which initiate data exchanges within the network.

According to various disclosed embodiments, there is provided a network as above, in which some of said nodes are landmark nodes which have a fixed known position.

According to various disclosed embodiments, there is provided a network as above, in which some of said nodes are landmark nodes which have a fixed position, but the majority of said nodes do not have a fixed position.

According to various disclosed embodiments, there is provided: a peer-to-peer network, comprising: a plurality of nodes which each have short-range communication capability and at least one instruction-executing device; at least some ones of said nodes being configured to discover neighboring nodes, construct a rough measure of distance to said neighboring nodes, construct a table of said rough measures, exchange tables with at least some ones of said neighbors, and thereby generate an approximation of the node's position with respect to said neighboring nodes; other ones of said nodes being configured to generate and propagate an estimated spatial embedding of said node and neighbors thereof; at least some ones of said nodes being configured to correct and transmit said approximation when an updated map of node positions in received; whereby said nodes collectively converge to a map of positions of all said nodes.

According to various disclosed embodiments, there is provided a network as above, in which at least some ones of said nodes are sensor nodes which sense environmental data.

According to various disclosed embodiments, there is provided a network as above, in which some of said nodes are sink nodes which export data from the network.

According to various disclosed embodiments, there is provided a network as above, in which some of said nodes are boot nodes which initiate data exchanges within the network.

According to various disclosed embodiments, there is provided a network as above, in which some of said nodes are landmark nodes which have a fixed known position.

According to various disclosed embodiments, there is provided a network as above, in which some of said nodes are landmark nodes which have a fixed position, but the majority of said nodes do not have a fixed position.

According to various disclosed embodiments, there is provided: A peer-to-peer network, comprising: a plurality of nodes which each have short-range communication capability and at least one instruction-executing device; at least some ones of said nodes being configured to discover neighboring nodes, construct a rough measure of distance to said neighboring nodes, construct a table of said rough measures, exchange tables with at least some ones of said neighbors, and thereby generate an approximation of the node's position with respect to said neighboring nodes; at least some ones of said nodes being configured to correct and transmit said approximation conditionally, when an updated map of node positions in received, only if said respective node is not determined to be low on power; whereby said nodes collectively converge to a map of positions of all said nodes.

According to various disclosed embodiments, there is provided a network as above, in which at least some ones of said nodes are sensor nodes which sense environmental data.

According to various disclosed embodiments, there is provided a network as above, in which some of said nodes are sink nodes which export data from the network.

According to various disclosed embodiments, there is provided a network as above, in which some of said nodes are boot nodes which initiate data exchanges within the network.

According to various disclosed embodiments, there is provided a network as above, in which some of said nodes are landmark nodes which have a fixed known position.

According to various disclosed embodiments, there is provided a network as above, in which some of said nodes are landmark nodes which have a fixed position, but the majority of said nodes do not have a fixed position.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, although the preferred embodiment is for networks with stationary or low mobility nodes, the innovative ideas can also be implemented with mobile networks. A simple example of this would be vehicles equipped with sensor nodes such that each vehicle is aware of the positions of nearby vehicles to avoid collision. By adjusting to finer frequency of QDV, embedding, and position update broadcasting as well as special polling, the modified embodiment can handle the mobility in such a network.

For another example, the disclosed inventions can of course be applied to networks with existing routing mechanisms as well. Existing network routing protocols, such as Distance Vector based or Link State based IP routing, already established distance information in the routing table stored in each node. Instead of measuring distances to and exchange distance information with its neighbors, the embodiment shall extract distance information from the routing table to calculate positions.

It should also be noted that the disclosed inventions are not only applicable to quantized distance, but can be applied to an enormous variety of distance measurements, including actual distance.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A method comprising:
    in a bootstrap node of a network including a plurality of nodes, initiating a process to collectively generate positional information of the nodes, including generating a set of positions of the bootstrap node and of one or more neighboring nodes of the bootstrap node, and propagating said set of positions to one or more nodes of the network;
    in a non-bootstrap node, participating in the process to collectively generate positional information of the nodes, including receiving one or more positions of one or more neighboring nodes of the non-bootstrap node, conditionally updating an estimate of the non-bootstrap node's own position, and propagating the non-bootstrap node's own position to one or more nodes.

2. The method of claim 1, wherein generating a set of positions of the bootstrap node and of one or more neighboring nodes of the bootstrap node comprises:
broadcasting a signal with an ID of the bootstrap node at a certain power level;
receiving one or more replies to the broadcasting from the one or more neighboring nodes, respectively including an ID of the replying neighboring node; and
deriving one or more distances of the one or more neighboring nodes.

3. The method of claim 2, wherein deriving one or more distances of the one or more neighboring nodes comprises deriving distances from an existing routing table.

4. The method of claim 3, wherein deriving one or more distances of the one or more neighboring nodes comprises using one or more coarsely quantized distances of the one or more neighboring nodes from the existing routing table.

5. A peer-to-peer network, comprising:
a plurality of nodes configured to collectively generate a map including positions of the nodes;
wherein at least some ones of said nodes are configured to discover neighboring nodes, construct approximate measures of distances to neighboring nodes, construct a table of approximate measures, and exchange tables with some neighboring nodes to generate an approximation of the node's position with respect to neighboring nodes; and
wherein at least some ones of said nodes are configured to correct and transmit said approximation when an updated map of node positions is received.

6. The network of claim 5, wherein at least some ones of said nodes are sensor nodes that sense environmental data.

7. The network of claim 5, wherein some of said nodes are sink nodes that export data from the network.

8. The network of claim 5, wherein some of said nodes are boot nodes that initiate data exchanges within the network.

9. The network of claim 5, wherein some of said nodes are landmark nodes that have a fixed known position.

10. The network of claim 5, wherein a first subset of said nodes are landmark nodes including respective fixed positions, and a second subset of said nodes do not have respective fixed positions:
wherein the second subset is larger than the first subset.

11. A peer-to-peer network, comprising:
a plurality of nodes which each have short-range communication capability and at least one instruction-executing device;
at least some ones of said nodes being configured to discover neighboring nodes, construct an approximate measure of distance to said neighboring nodes, construct a table of said approximate measures, exchange tables with at least some ones of said neighbors, and thereby generate an approximation of the node's position with respect to said neighboring nodes;
other ones of said nodes being configured to generate and propagate an estimated spatial embedding of said node and neighbors thereof;
at least some ones of said nodes being configured to correct and transmit said approximation when an updated map of node positions in received;
whereby said nodes collectively converge to a map of positions of all said nodes.

12. The network of claim 11, wherein at least some ones of said nodes are sensor nodes that sense environmental data.

13. The network of claim 11, wherein some of said nodes are sink nodes that export data from the network.

14. The network of claim 11, wherein some of said nodes are boot nodes that initiate data exchanges within the network.

15. The network of claim 11, wherein some of said nodes are landmark nodes that have a fixed known position.

16. The network of claim 11, wherein some of said nodes are landmark nodes that have a fixed position, but the majority of said nodes do not have a fixed position.

17. A peer-to-peer network, comprising:
a plurality of nodes which each have short-range communication capability and at least one instruction-executing device;
at least some ones of said nodes being configured to discover neighboring nodes, construct an approximate measure of distance to said neighboring nodes, construct a table of said approximate measures, exchange tables with at least some ones of said neighbors, and thereby generate an approximation of the node's position with respect to said neighboring nodes;
at least some ones of said nodes being configured to correct and transmit said approximation conditionally, when an updated map of node positions in received, only if said respective node is not determined to be low on power; and
whereby said nodes collectively converge to a map of positions of all said nodes.

18. The network of claim 17, wherein at least some ones of said nodes are sensor nodes that sense environmental data.

19. The network of claim 17, wherein some of said nodes are sink nodes that export data from the network.

20. The network of claim 17, wherein some of said nodes are boot nodes that initiate data exchanges within the network.

21. The network of claim 17, wherein some of said nodes are landmark nodes that have a fixed known position.

22. The network of claim 17, wherein some of said nodes are landmark nodes that have a fixed position, but the majority of said nodes do not have a fixed position.

23. A method comprising:
constructing, by a node of a network of nodes, a positional information data structure of the node including positional information of the node relative to a plurality of neighboring nodes;
receiving, by the node, from the plurality of neighboring nodes, respective positional information data structures of the neighboring nodes;
generating, by the node, a set of positions of the node and of the neighboring nodes; and
broadcasting, by node, the set of positions, to initiate a process to collectively generate positional information of the nodes.

24. The method of claim 23 further comprising repeating, by the node, the constructing, receiving, generating and broadcasting after an elapse of a time period.

25. The method of claim 23, wherein the positional information data structures comprise quantized distance vectors including quantized distances, and wherein generating a set of positions comprises compiling, by the node, a distance matrix including quantized distances to the neighboring nodes, based on the quantized distance vectors.

26. The method of claim 25, wherein generating a set of positions further comprises estimating the positions, by the node, using the distance matrix and applying a multidimensional scaling algorithm.

27. An apparatus comprising:
   means for constructing a positional information data structure of the apparatus including positional information relative to a plurality of neighboring apparatuses of the apparatus, the apparatuses being members of a network;
   means for receiving from the plurality of neighboring apparatuses respective positional information data structures of the neighboring apparatuses;
   means for generating a set of positions of the apparatus and of the neighboring apparatuses; and
   means for broadcasting the set of positions to initiate a process to collectively generate positional information of the apparatuses.

28. The apparatus of claim 27, wherein the positional information data structures comprise quantized distance vectors including quantized distances, and wherein means for generating a set of positions comprises means for compiling a distance matrix including quantized distances to the neighboring apparatuses of the apparatus, based on the quantized distance vectors.

29. The apparatus of claim 28, wherein means for generating a set of positions further comprises means for estimating the positions using the distance matrix and applying a multidimensional scaling algorithm.

30. A method comprising:
   constructing, by a node of a network of nodes, a positional information data structure of the node including positional information relative to a plurality of neighboring nodes;
   first receiving, by the node, from the plurality of neighboring nodes of the node, respective positional information data structures of the neighboring nodes;
   second receiving, by the node, from a bootstrap node of the network, a first set of positions of the bootstrap node and of neighboring nodes of the bootstrap node;
   generating, by the node, in response to the second receiving, a second set of positions of the node and of the neighboring nodes of the node; and
   broadcasting, by the node, upon generation, the second set of positions, to participate in a process to collectively generate positional information of the nodes.

31. The method of claim 30 further comprising:
   third receiving, by the node, from a plurality of neighboring nodes of the node, over a time period, a plurality of position updates; and
   generating, by the node, in response to the third receiving, the second set of positions of the node and of the neighboring nodes of the node.

32. The method of claim 30 further comprising:
   third receiving, by the node, from a plurality of neighboring nodes of the node, over a time period, a plurality of position updates;
   conditionally polling a plurality of neighboring nodes of the node, by the node, for the node's position, when the number of position updates received is below a threshold;
   updating a current estimate of the node's position, by the node, based at least in part on the results of the polling; and
   generating, by the node, in response to the updating, the second set of positions of the node and of the neighboring nodes of the node.

33. An apparatus comprising:
   means for constructing a positional information data structure of the apparatus including positional information relative to a plurality of neighboring apparatuses, the apparatuses being members of a network;
   means for first receiving, from the plurality of neighboring apparatuses respective positional information data structures of the neighboring apparatuses, and second receiving from, a bootstrap apparatus, a first set of positions of the bootstrap apparatus and of neighboring apparatuses of the bootstrap apparatus;
   means for generating, in response to the second receiving, a second set of positions of the apparatus and of the neighboring apparatuses of the apparatus; and
   means for broadcasting, upon generation, the second set of positions, to participate in a process to collectively generate positional information of the apparatuses.

34. The apparatus of claim 33, wherein
   means for first and second receiving is further for third receiving from a plurality of neighboring apparatuses of the apparatus, over a time period, a plurality of position updates; and
   means for generating is further for generating the second set of positions of the apparatus and of the neighboring apparatuses of the apparatus in response to the third receiving.

35. The apparatus of claim 33, wherein means for first and second receiving is further for third receiving, from a plurality of neighboring apparatuses, over a time period, a plurality of position updates.

36. The apparatus of claim 35 further comprising:
   means for conditionally polling a plurality of neighboring apparatuses of the apparatus for the apparatus's position, when the number of position updates received is below a threshold;
   means for updating a current estimate of the apparatus's position, based at least in part on the results of the polling.

37. The apparatus of claim 36, wherein means for generating is further for generating the second set of positions of the apparatus and of the neighboring apparatuses of the apparatus, in response to the updating.

38. A method comprising:
   constructing, by a node of a network of nodes, a distance data structure of the node including distances to a plurality of neighboring nodes;
   receiving, by the node, from a bootstrap node of the network, a set of positions of the bootstrap node and of neighboring nodes of the bootstrap node;
   updating, by the node, in response to the receiving, an estimate of a position of the node to participate in a process to collectively generate positional information of the nodes.

39. The method of claim 38 further comprising:
   second receiving, by the node, from one or more neighboring nodes of the node, over a time period, one or more position updates; and
   updating, by the node, in response to the second receiving, the estimate of the position of the node.

40. The method of claim 39 further comprising repeating the receiving or second receiving and the responsive updating until a power supply of the node falls below a power level.

41. An apparatus comprising:
   means for constructing a distance data structure of the apparatus including distances to a plurality of neighboring apparatuses of the apparatus, the apparatuses being members of a network;
   means for receiving, from a bootstrap apparatus of the network, a set of positions of the bootstrap apparatus and of neighboring apparatuses of the bootstrap apparatus; and means for updating, in response to the receiving, an estimate of a position of the apparatus to participate in a process to collectively generate positional information of the apparatuses.

42. The apparatus of claim 41 wherein means for receiving is further for second receiving from one or more neighboring apparatuses of the apparatus, over a time period, one or more position updates; and means for updating is further for updating the estimate of the position of the apparatus, in response to the second receiving.

43. The apparatus of claim 42, wherein said means repeat the receiving or second receiving, and the responsive updating, until power supply of the apparatus falls below a power level.

\* \* \* \* \*